(12) United States Patent
Kang et al.

(10) Patent No.: US 10,880,590 B2
(45) Date of Patent: Dec. 29, 2020

(54) ELECTRONIC DEVICE AND SERVER FOR VIDEO PLAYBACK

(71) Applicant: Samsung Electronics Co., Ltd., Gyeonggi-do (KR)

(72) Inventors: In Seok Kang, Gyeonggi-do (KR); Se Hyun Lee, Gyeonggi-do (KR); Kwang Tai Kim, Gyeonggi-do (KR); Ha Joong Park, Gyeonggi-do (KR); Dong Hyun Yeom, Gyeonggi-do (KR); Jong Hoon Won, Gyeonggi-do (KR); Ki Huk Lee, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 15/892,024

(22) Filed: Feb. 8, 2018

(65) Prior Publication Data
US 2018/0227607 A1 Aug. 9, 2018

(30) Foreign Application Priority Data

Feb. 8, 2017 (KR) ........................ 10-2017-0017583

(51) Int. Cl.
*G06F 3/00* (2006.01)
*H04N 21/2387* (2011.01)
(Continued)

(52) U.S. Cl.
CPC ....... *H04N 21/2387* (2013.01); *G02B 27/017* (2013.01); *H04N 21/2408* (2013.01); *H04N 21/252* (2013.01); *H04N 21/25808* (2013.01); *H04N 21/25866* (2013.01); *H04N 21/25883* (2013.01); *H04N 21/25891* (2013.01); *H04N 21/26258* (2013.01); *H04N 21/41407* (2013.01); *H04N 21/42222* (2013.01); *H04N 21/44222* (2013.01); *H04N 21/4508* (2013.01);
(Continued)

(58) Field of Classification Search
CPC ......... H04N 21/4622; H04N 21/47202; H04N 21/00
See application file for complete search history.

(56) References Cited

U.S. PATENT DOCUMENTS 8,131,875 B1 * 3/2012 Chen ................. H04M 1/72522
707/E17.121
8,854,457 B2 10/2014 De Vleeschouwer et al.
(Continued)

FOREIGN PATENT DOCUMENTS

| JP | 5683756 | 3/2015 |
|---|---|---|
| WO | WO 2010/127418 | 11/2010 |
| WO | WO 2016/178340 | 11/2016 |

OTHER PUBLICATIONS

European Search Report dated May 3, 2018 issued in counterpart application No. 18155686.1-1209, 12 pages.

*Primary Examiner* — Jason Salce
(74) *Attorney, Agent, or Firm* — The Farrell Law Firm, P.C.

(57) ABSTRACT

An electronic device is disclosed and includes a communication module; a display; a memory storing context information of a user; and a processor. The processor is configured to verify a video capable of being played depending on a playback scenario information; determine one or more pieces of the playback scenario information generated based on the context information; and play the video based on the determined playback scenario information.

5 Claims, 15 Drawing Sheets

(51) Int. Cl.

| | |
|---|---|
| *H04N 21/258* | (2011.01) |
| *G02B 27/01* | (2006.01) |
| *H04N 21/24* | (2011.01) |
| *H04N 21/25* | (2011.01) |
| *H04N 21/262* | (2011.01) |
| *H04N 21/81* | (2011.01) |
| *H04N 21/6587* | (2011.01) |
| *H04N 21/4728* | (2011.01) |
| *H04N 21/45* | (2011.01) |
| *H04N 21/414* | (2011.01) |
| *H04N 21/422* | (2011.01) |
| *H04N 21/658* | (2011.01) |
| *H04N 21/442* | (2011.01) |
| *H04N 21/44* | (2011.01) |

(52) U.S. Cl.
CPC ..... *H04N 21/4728* (2013.01); *H04N 21/6582* (2013.01); *H04N 21/6587* (2013.01); *H04N 21/816* (2013.01); *H04N 21/44008* (2013.01)

(56) References Cited

U.S. PATENT DOCUMENTS

| | | | |
|---|---|---|---|
| 9,196,072 B2 | 11/2015 | Oh et al. | |
| 9,805,490 B2 | 10/2017 | Oh et al. | |
| 2001/0005218 A1* | 6/2001 | Gloudemans | H04N 5/272 348/157 |
| 2002/0063799 A1* | 5/2002 | Ortiz | A63B 71/06 348/559 |
| 2002/0188943 A1* | 12/2002 | Freeman | G03C 1/26 725/38 |
| 2003/0085992 A1* | 5/2003 | Arpa | G06T 15/205 348/47 |
| 2007/0140647 A1* | 6/2007 | Kusunoki | H04N 7/17318 386/344 |
| 2008/0143727 A1 | 6/2008 | Oh et al. | |
| 2008/0201748 A1* | 8/2008 | Hasek | H04N 7/17309 725/98 |
| 2009/0189982 A1* | 7/2009 | Tawiah | A63F 13/65 348/157 |
| 2010/0223407 A1* | 9/2010 | Dong | H04N 21/2343 710/70 |
| 2010/0287580 A1* | 11/2010 | Harding | G06Q 30/0247 725/14 |
| 2011/0274179 A1* | 11/2011 | Holden | H04N 21/23109 375/240.25 |
| 2012/0057852 A1 | 3/2012 | Devleeschouwer et al. | |
| 2013/0298155 A1* | 11/2013 | Stepanov | H04N 21/2541 725/31 |
| 2014/0328382 A1* | 11/2014 | Lee | H04N 19/37 375/240.01 |
| 2015/0235128 A1* | 8/2015 | Mate | H04N 21/2743 706/46 |
| 2015/0375117 A1* | 12/2015 | Thompson | A63F 13/35 463/9 |
| 2016/0071301 A1 | 3/2016 | Oh et al. | |
| 2016/0088048 A1* | 3/2016 | Park | H04N 19/127 705/57 |
| 2016/0094894 A1* | 3/2016 | Inayatullah | H04H 60/31 725/12 |
| 2018/0146218 A1 | 5/2018 | Shimura | |

\* cited by examiner

ELECTRONIC DEVICE AND SERVER FOR VIDEO PLAYBACK

PRIORITY

This application claims priority under 35 U.S.C. § 119(a) to Korean Patent Application Serial No. 10-2017-0017583, which was filed in the Korean Intellectual Property Office on Feb. 8, 2017, the entire content of which is incorporated herein by reference.

BACKGROUND

1. Field of the Disclosure

The present disclosure relates generally to an electronic device capable of playing a video, and a server supporting a video playback of the electronic device.

2. Description of the Related Art

With the development of electronic technologies, various types of electronic devices are being developed and distributed. Devices capable of providing various content and services through the electronic devices are emerging.

Devices capable of capturing a wide-angle image (e.g., an omnidirectional image) are being developed, and devices, such as a head mounted display (HMD), for playing a wide-angle image are being developed.

When watching a wide-angle image, a user may not watch the whole area of the wide-angle image, and may watch only a part of the wide-angle image by moving a viewpoint through an input device.

The user needs to generate an input event to watch an area, which the user desires, of the wide-angle image. In particular, in the case of a video having a long playback time, the user needs to manipulate the input device for a long time, thereby inconveniencing the user.

SUMMARY

Aspects of the present disclosure are to address at least the above-mentioned problems and/or disadvantages and to provide at least the advantages described below. Accordingly, an aspect of the present disclosure is to provide an electronic device allowing a user to watch a wide-angle image even though the user does not generate an input event, and a server supporting video playback of the electronic device.

Accordingly, an aspect of the present disclosure is to provide, even though a user input is not received, an electronic device which plays a video depending on a playback scenario information to change the playback state of a wide-angle image, thereby improving the user experience.

In accordance with an aspect of the present disclosure, an electronic device is provided. The electronic device includes a communication module; a display; a memory configured to store context information of a user; and a processor. The processor is configured to verify a video capable of being played depending on a playback scenario information; determine one of one or more pieces of the playback scenario information generated based on the context information; and play the video based on the determined playback scenario information.

In accordance with an aspect of the present disclosure, a server is provided. The server includes a communication module; and a processor. The processor is configured to receive pieces of playback history information of a video from a plurality of first electronic devices through the communication module; receive a request for a playback scenario information of the video from a second electronic device, wherein the request includes context information of a user; generate one or more pieces of the playback scenario information associated with the context information, based on the pieces of playback history information; and transmit the one or more pieces of playback scenario information to the second electronic device.

In accordance with an aspect of the present disclosure, an electronic device is provided. The electronic device includes a communication module; a display; an input module configured to receive a user input; a memory configured to store context information of a user; and a processor. The processor is configured to play a video including a wide-angle image based on the user input; generate playback history information including viewpoint information for each playback time; and store the playback history information in the memory in association with the context information.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
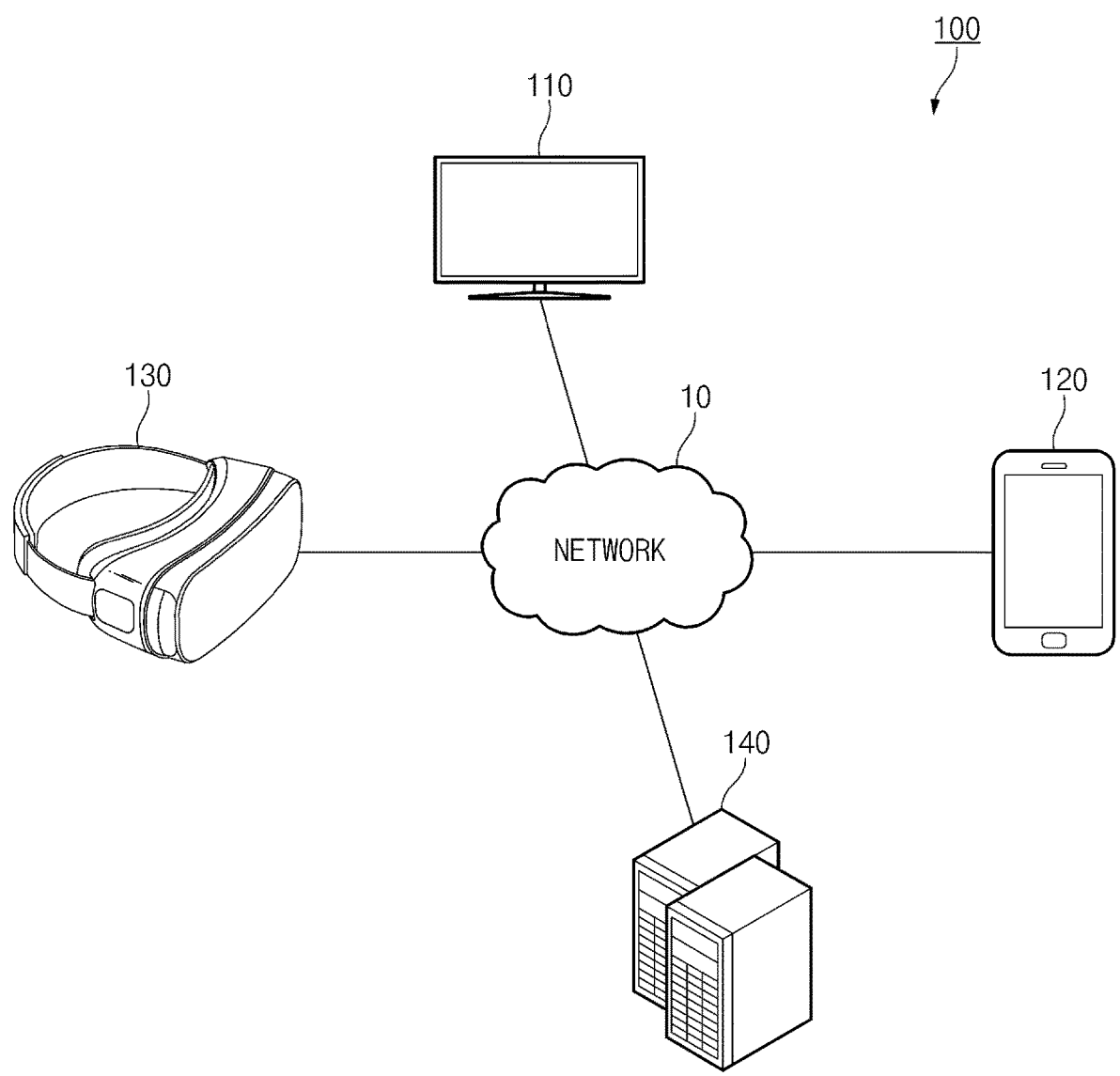
FIG. 1 illustrates a video playback system, according to various embodiments of the present disclosure.

Hereinafter, various embodiments of the present disclosure may be described with reference to the accompanying drawings. Accordingly, those of ordinary skill in the art will recognize that modifications, equivalents, and/or alternatives on the various embodiments described herein can be made without departing from the scope and spirit of the present disclosure. With regard to the description of drawings, similar elements may be marked by similar reference numerals.

The terms of a singular form may include plural forms unless otherwise specified. In the present disclosure, the expressions "A or B", "at least one of A and/or B", or "one or more of A and/or B", etc. may include any and all combinations of one or more of the associated listed items. Terms, such as "first", "second", etc. may be used to refer to various elements regardless of the order and/or the priority and to distinguish the relevant elements from other elements, but do not limit the elements. When an element (e.g., a first element) is referred to as being "(operatively or communicatively) coupled with/to" or "connected to" another element (e.g., a second element), the element may be directly coupled with/to or connected to the other element or an intervening element (e.g., a third element) may be present.

The expression "configured to" used in the present disclosure may be interchangeably used with the expressions "suitable for", "having the capacity to", "adapted to", "made to", "capable of", or "designed to" in hardware or software. The expression "a device configured to" may mean that the device is "capable of" operating together with another device or other components. A "processor configured to (or set to) perform A, B, and C" may mean a dedicated processor (e.g., an embedded processor) for performing a corresponding operation or a generic-purpose processor (e.g., a central processing unit (CPU) or an application processor (AP)) which performs corresponding operations by executing one or more software programs which are stored in a memory device.

An electronic device according to various embodiments of the present disclosure may include smartphones, tablet personal computers (PCs), mobile phones, video telephones, electronic book readers, desktop PCs, laptop PCs, netbook computers, workstations, servers, personal digital assistants (PDAs), portable multimedia players (PMPs), motion picture experts group (MPEG-1 or MPEG-2) audio layer 3 (MP3) players, medical devices, cameras, or wearable devices. The wearable device may include an accessory type (e.g., watches, rings, bracelets, anklets, necklaces, glasses, contact lens, or HMDs, a fabric or garment-integrated type (e.g., an electronic apparel), a body-attached type (e.g., a skin pad or tattoos), or a bio-implantable type (e.g., an implantable circuit). The electronic device may include televisions (TVs), digital versatile disc (DVD) players, audio players and recorders, refrigerators, air conditioners, cleaners, ovens, microwave ovens, washing machines, air cleaners, set-top boxes, home automation control panels, security control panels, media boxes (e.g., Samsung HomeSync™, Apple TV™, or Google TV™), game consoles (e.g., Xbox™ or PlayStation™), electronic dictionaries, electronic keys, camcorders, electronic picture frames, etc.

FIG. 1 is a view illustrating a video playback system, according to various embodiments of the present disclosure.

Referring to FIG. 1, a video playback system 100 may include a plurality of electronic devices including first electronic devices 110 and 120, a second electronic device 130, and a server 140. According to an embodiment of the present disclosure, three or more first electronic devices may be included in the video playback system 100.

Each element included in the video playback system 100 may be connected to each other over a network 10. The plurality of first electronic devices 110 and 120, the second electronic device 130, and the server 140 may be connected to each other over a mobile communication network or an Internet network.

According to an embodiment of the present disclosure, the plurality of first electronic devices 110 and 120, and the second electronic device 130 may play a video. The video may include a wide-angle image and/or audio. The wide-angle image may mean an image that is not capable of being displayed on a display at one time because the wide-angle image has a field of view wider than the field of view that the display has. The wide-angle image may include a panorama image or an omnidirectional image of 360° that has a field of view (FOV) greater than a specified angle (e.g., 180° or 270°). The wide-angle image may be generated by composing a plurality of images captured by a plurality of cameras at different viewpoints. Each of the plurality of first electronic devices 110 and 120 may be a device capable of playing a video including the wide-angle image. Each of the plurality of first electronic devices 110 and 120 may include an HMD, a smart TV, a smartphone, a tablet PC, a notebook PC, a desktop PC connected to a monitor, etc. that include a program (or an application) processing the wide-angle image and displaying the processed result on the display.

According to an embodiment of the present disclosure, the plurality of first electronic devices 110 and 120, and the second electronic device 130 may change a playback state of the video depending on a user input during the playback of the video. The plurality of first electronic devices 110 and 120, and the second electronic device 130 may change the viewpoint of the wide-angle image displayed on the display or may zoom in or out from an image on the display, depending on the user input. The plurality of first electronic devices 110 and 120, and the second electronic device 130 may change the playback speed of the video or may change the volume (or level) of the audio, depending on the user input.

According to an embodiment of the present disclosure, the plurality of first electronic devices 110 and 120 may store playback history information of the video. The plurality of first electronic devices 110 and 120 may store the playback history information of the video with time. The playback history information of the video may include viewpoint information with time (or viewpoint information for each playback time), zoom information with time (or zoom information for each playback time), playback speed information of the video with time (or playback speed information for each playback time), and audio volume information with time (or audio volume information for each playback time). The plurality of first electronic devices 110 and 120 may transmit the playback history information of the video and profile information (or context information) (e.g., first profile information) of a user of the plurality of first electronic devices 110 and 120 to an external electronic device (e.g., the server 140). The first profile information may include at least one of the user's age, gender, occupation, friend, residence location, nationality, hobby, and interest. The first profile information may further include at least one of the location of the first electronic device 110 or 120, the size of the display included in the first electronic device 110 or 120, the resolution of the display, and the frame rate of the display.

According to an embodiment of the present disclosure, the second electronic device 130 make a request for the playback scenario information of the video to the server 140. The request may include profile information (e.g., second profile information) of a user of the second electronic device 130. The second profile information may include at least one of the user's age, gender, occupation, friend, residence location, nationality, hobby, and interest. The second profile information may further include the location of the second electronic device 130, the size of the display included in the second electronic device 130, the resolution of the display, and the framerate of the display. The second electronic device 130 may receive playback scenario information associated with the second profile information from the server 140 based on the request. The second electronic device 130 may play the video based on the playback scenario information received from the server 140. The playback scenario information may include viewpoint information with time (or viewpoint information for each playback time), zoom information with time (or zoom information for each playback time), playback speed information of the video with time (or playback speed information for each playback time), and audio volume information with time (or audio volume information for each playback time). The second electronic device 130 may be a device capable of playing a video including the wide-angle image. The second electronic device 130 may include an HMD, a smart TV, a smartphone, a tablet PC, a notebook PC, a desktop PC connected to a monitor, etc. that includes a program (or an application) processing the wide-angle image and displaying the processed result on the display.

According to an embodiment of the present disclosure, the server 140 may generate the playback scenario information based on pieces of playback history information. If a request for the playback scenario information of the video is received from the second electronic device 130, the server 140 may generate one or more pieces of playback scenario information, based on one or more pieces of playback history information corresponding to the second profile information. The server 140 may transmit one or more pieces of playback scenario information associated with the second profile information, to the second electronic device 130.

For convenience of description, each of the functions of the plurality of first electronic devices 110 and 120 may be distinguished from the function of the second electronic device 130. However, each of the second electronic device 130 and the plurality of first electronic devices 110 and 120 may perform the same or similar function.

According to an embodiment of the present disclosure, the user of the second electronic device 130 may watch a video depending on the playback scenario information that is generated based on the video playback history of users of the plurality of first electronic devices 110 and 120 having the similar profile.

Figure 2:
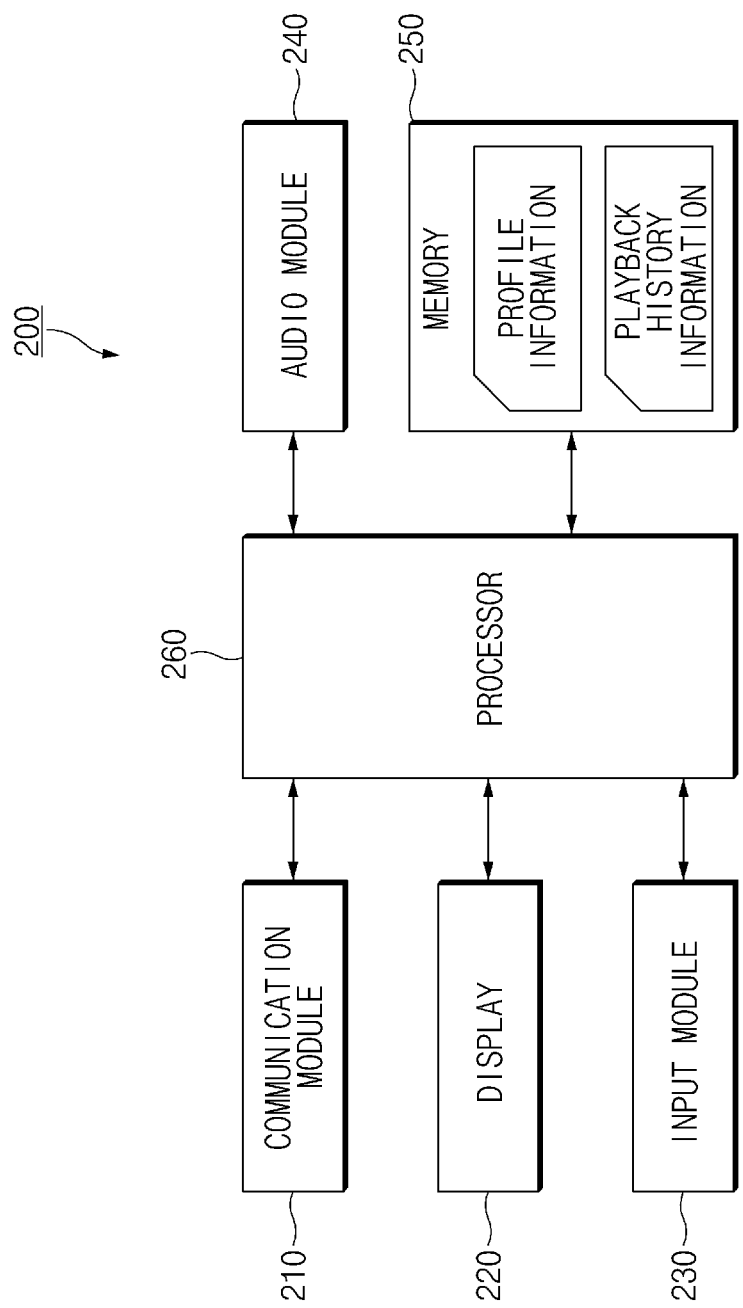
FIG. 2 is a block diagram illustrating a configuration of a first electronic device, according to various embodiments of the present disclosure.

FIG. 2 is a block diagram illustrating a configuration of a first electronic device, according to various embodiments of the present disclosure.

Referring to FIG. 2, a first electronic device 200 (e.g., the first electronic device 110 or 120) may include a communication module 210, a display 220, an input module 230, an audio module 240, a memory 250, and a processor 260.

According to an embodiment of the present disclosure, the communication module 210 may communicate with an external electronic device (e.g., the second electronic device 130 or the server 140). The communication module 210 may transmit playback history information of a video and/or first profile information to an external electronic device.

According to an embodiment of the present disclosure, the communication module 210 may include at least one of a cellular module, a wireless-fidelity (Wi-Fi) module, a Bluetooth™ module, near field communication (NFC), a global navigation satellite system (GNSS) module (e.g., a global positioning system (GPS) module), and a network interface card.

According to an embodiment of the present disclosure, the display 220 may display an image included in the video. The video may include a wide-angle image, and the display 220 may display a part of the wide-angle image depending on viewpoint information determined by a user input.

According to an embodiment of the present disclosure, the input module 230 may receive a user input. The input module 230 may receive the user input for changing the playback state of a video.

According to an embodiment of the present disclosure, the input module 230 may include a gyro sensor, a touch pad, and a button. The gyro sensor may sense the rotation of the first electronic device 200 to output a rotational angular velocity in three directions (e.g., yaw axis, pitch axis, and roll axis). The touch pad may sense the touch manipulation of a user. The button may include a plurality of buttons, and may sense the user's push operation on each of the plurality of buttons. The input module 230 may include an input device (e.g., a mouse, a joystick, etc.) electrically connected to the first electronic device 200.

According to an embodiment of the present disclosure, the audio module 240 may output audio. The audio module 240 may output the audio included in the video. The audio module 240 may include a built-in speaker or an audio interface capable of connecting an earphone, an external speaker, etc. The audio module 240 may change the volume (or level) of the audio that is output depending on the user input.

According to an embodiment of the present disclosure, the memory 250 may store first profile information (or first context information). The first profile information may include at least one of the user's age, gender, occupation, friend, residence location, nationality, hobby, and interest. The first profile information may further include at least one of the location of the first electronic device 200, the size of the display included in the first electronic device 200, the resolution of the display, and the framerate of the display. The profile information of the user may be input by the user through the input module 230 or may be generated based on the activity history of the user.

According to an embodiment of the present disclosure, the memory 250 may store the playback history information of the video. The playback history information may include at least one of viewpoint information, zoom information, playback speed information of the video, and audio volume information. The memory 250 may store the playback history information in association with the video identification information.

According to an embodiment of the present disclosure, the processor 260 may control the overall operations of the first electronic device 200. The processor 260 may control each of the communication module 210, the display 220, the input module 230, the audio module 240, and the memory 250 to play the video and may store the playback history information. The first electronic device 200 may include at least one processor 260. The first electronic device 200 may include a plurality of processors 260 capable of executing at least one function. The processor 260 may be implemented as a system on chip (SoC) that includes a CPU, a graphic processing unit (GPU), a memory, etc.

According to an embodiment of the present disclosure, the processor 260 may play the video. For example, the processor 260 may play the video that is stored in the memory 250 or is received from an external electronic device through the communication module 210. The processor 260 may display a part of a wide-angle image included in the video on a display. The processor 260 may output the audio included in the video through the audio module 240.

According to an embodiment of the present disclosure, the processor 260 may change the playback state of the video based on the user input during the playback of the video. The processor 260 may change the user input to the viewpoint information corresponding to the wide-angle image and may change the viewpoint of the wide-angle image displayed on the display based on the viewpoint information. The processor 260 may change the user input to zoom information and may zoom in or out from an image displayed on the display, based on the zoom information. The processor 260 may change the playback speed of the video or may change the volume (or level) of the audio, depending on the user input.

According to an embodiment of the present disclosure, the processor 260 may store the playback history information of the video, in the memory 250. The processor 260 may store the playback state of the video that is changed with time. The playback history information of the video may include at least one of viewpoint information with time, zoom information with time, playback speed information of the video with time, and audio volume information with time. The viewpoint information may include coordinate information on a three-dimensional coordinate system (e.g., a spherical coordinate system). The processor 260 may store the playback history information corresponding to a part of the whole playback time of the video. In the case where a part of the video is not played because the user skips the video, the processor 260 may store only the playback history information corresponding to a time when the video is normally played.

According to an embodiment of the present disclosure, the processor 260 may verify the identification information of the video. The processor 260 may verify the identification information of the video by using meta data (e.g., a video identifier, a name, a producer, a playback time, etc.) included in the video. The memory 250 may store the playback history information in association with the video identification information.

According to an embodiment of the present disclosure, the processor 260 may transmit playback history information of the video and first profile information to an external electronic device (e.g., the server 140) through the communication module 210. If the playback of the video ends, the processor 260 may transmit the playback history information and the first profile information. Even in the case where the playback of the video does not end, the processor 260 may periodically transmit the playback history information.

According to an embodiment of the present disclosure, the processor 260 may analyze an image displayed on the display 220, by using an image analysis algorithm and may verify that the image includes an object. The processor 260 may update the first profile information based on if the image includes the object. The processor 260 may add the object included in the image during a specified time (or a specified frequency), to the interest of the user.

Figure 3A:
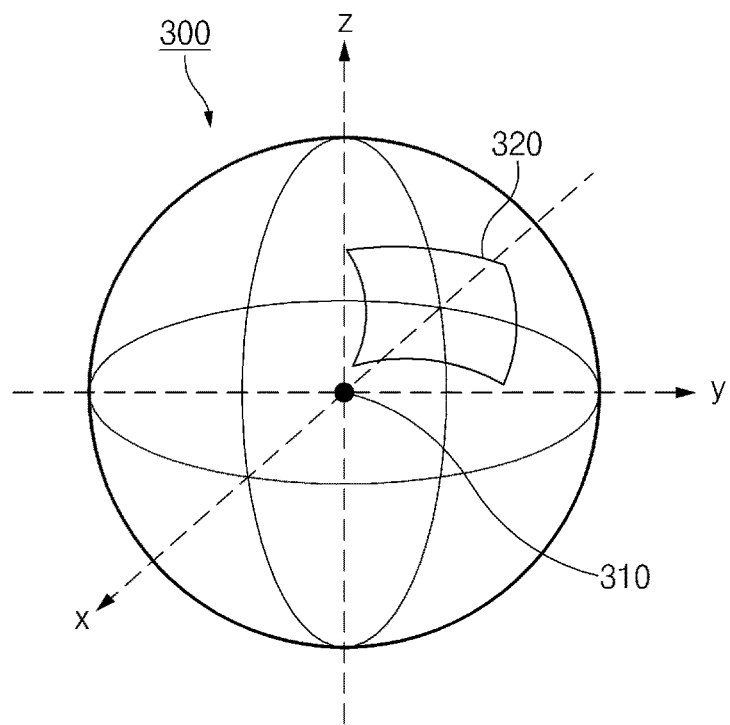
FIGS. 3A and 3B illustrate a wide-angle image, according to an embodiment of the present disclosure.
Figure 3B:
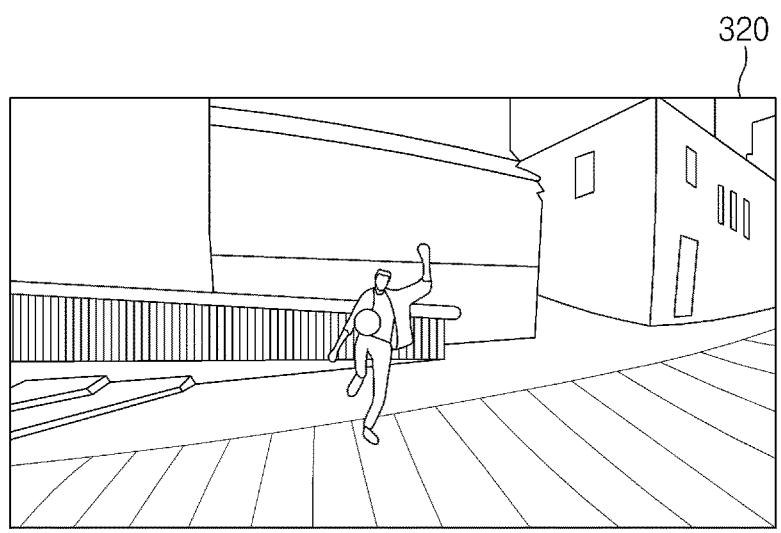

FIGS. 3A and 3B illustrate a wide-angle image, according to an embodiment of the present disclosure.

Referring to FIG. 3A, a wide-angle image 300 may be an omnidirectional image obtained by capturing an omnidirectional subject, with respect to a camera capturing the wide-angle image 300. A two-dimensional wide-angle image may be generated by stitching a plurality of images that are separately captured, and the two-dimensional wide-angle image may be changed to the three-dimensional wide-angle image 300. The wide-angle image 300 may be disposed on a spherical surface with respect to a capture point 310 of the wide-angle image 300.

Referring to FIGS. 3A and 3B, the display 220 may display a partial area 320 of the wide-angle image 300. The display 220 may display the partial area 320 of the wide-angle image 300 depending on viewpoint information determined by a user input.

Figure 4:
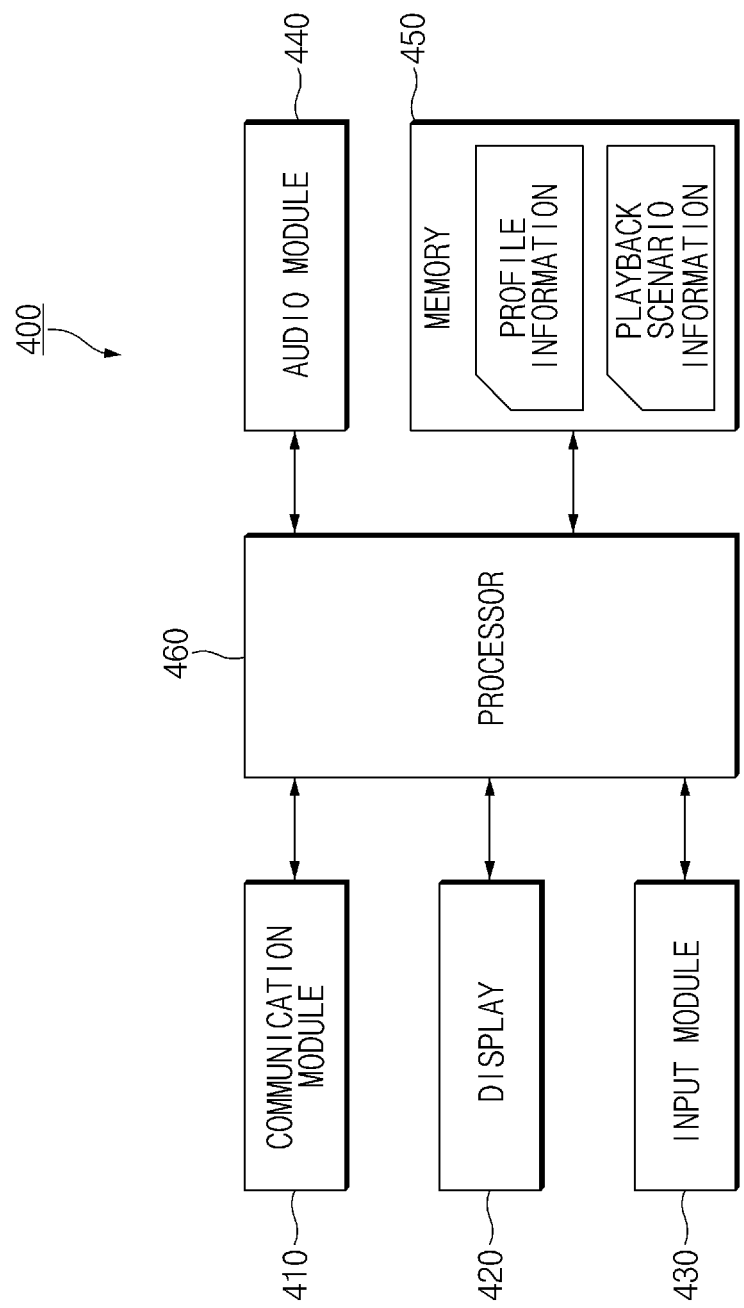
FIG. 4 is a block diagram illustrating a configuration of a second electronic device, according to various embodiments of the present disclosure.

FIG. 4 is a block diagram illustrating a configuration of a second electronic device, according to various embodiments of the present disclosure.

Referring to FIG. 4, a second electronic device 400 may include a communication module 410, a display 420, an input module 430, an audio module 440, a memory 450, and a processor 460.

According to an embodiment of the present disclosure, the communication module 410 may communicate with an external electronic device. The communication module 410 may transmit playback history information of a video and/or the second profile information to the external electronic device.

According to an embodiment of the present disclosure, the communication module 410 may include a cellular module, a Wi-Fi module, a Bluetooth module, NFC module, a GNSS module (e.g., a GPS module), and a network interface card.

According to an embodiment of the present disclosure, the display 420 may display an image included in the video. The video may include a wide-angle image, and the display 420 may display a part of the wide-angle image based on the viewpoint information included in playback scenario information.

According to an embodiment of the present disclosure, the input module 430 may receive a user input. The input module 430 may receive a user input for requesting the playback scenario information, or for selecting one of one or more pieces of playback scenario information received from a server. The input module 430 may receive the user input for changing the playback state of a video.

According to an embodiment of the present disclosure, the input module 430 may include a gyro sensor, a touch pad, and a button. The gyro sensor may sense the rotation of the second electronic device 400 to output a rotational angular velocity in three directions (e.g., yaw axis, pitch axis, and roll axis). The touch pad may sense the touch of the user. The button may include a plurality of buttons, and may sense the user's push operation on each of the plurality of buttons. The input module 430 may include an input device (e.g., a mouse, a joystick, etc.) electrically connected to the second electronic device 400.

According to an embodiment of the present disclosure, the audio module 440 may output audio. The audio module 440 may output the audio included in the video. The audio module 440 may include a built-in speaker or an audio interface capable of connecting an earphone, an external speaker, etc. The audio module 440 may change the volume (or level) of the audio that is output depending on the user input.

According to an embodiment of the present disclosure, the memory 450 may store the second profile information. The second profile information may include the user's age, gender, occupation, friend, residence location, nationality, hobby, and interest. The second profile information may further include at least one of the location of the second electronic device 400, the size of the display included in the second electronic device 400, the resolution of the display, and the framerate of the display. The profile information of the user may be input by the user through the input module 430 or may be generated based on the activity history of the user.

According to an embodiment of the present disclosure, the memory 450 may store the playback scenario information of the video. The playback scenario information may include at least one of viewpoint information, zoom information, playback speed information of the video, and audio volume information.

According to an embodiment of the present disclosure, the processor 460 may control overall operations of the second electronic device 400. The processor 460 may control each of the communication module 410, the display 420, the input module 430, the audio module 440, and the memory 450 to play the video based on the playback scenario information. The second electronic device 400 may include at least one processor 460. The second electronic device 400 may include a plurality of processors 460 capable of executing at least one function. The processor 460 may be implemented as an SoC that includes a CPU, a GPU, a memory, etc.

According to an embodiment of the present disclosure, the processor 460 may receive the user input for selecting a video through the input module 430. The processor 460 may verify the identification information of the selected video. The processor 460 may verify the identification information of the video by using meta data (e.g., a video identifier, a name, a producer, a playback time, etc.) included in the selected video. The processor 460 may receive a user input for requesting the playback scenario information of the selected video. If the user input is received, the processor 460 may make a request for the playback scenario information of the selected video to an external electronic device through the communication module 410. The request for the playback scenario information may include the second profile information. The request for the playback scenario information may include the identification information of the selected video.

According to an embodiment of the present disclosure, the processor 460 may receive one or more pieces of playback scenario information associated with the second profile information, from the server 140 through the communication module 410. The playback scenario information may be generated based on the playback history information, which is generated by a first user of a plurality of first electronic devices and which coincides with the age of a second user of the second electronic device 400, the gender of the second user, the occupation of the second user, the friend of the second user, the residence location of the second user, the nationality of the second user, the hobby of the second user, the interest of the second user, the current location of the second electronic device 400, the size of the display, the resolution of the display, or the framerate of the display. The processor 460 may store the playback scenario information in the memory 450.

According to an embodiment of the present disclosure, the processor 460 may play the video based on one or more pieces of playback scenario information received from the server. The processor 460 may display a part of the wide-angle image on the display 420 based on viewpoint information included in the playback scenario information. The processor 460 may verify an area corresponding to the viewpoint information in the wide-angle image and may display an image included in the verified area on the display 420. The processor 460 may display a part of the wide-angle image on the display 420 based on zoom information included in the playback scenario information. The processor 460 may zoom in or out an image displayed on the display 420, depending on the zoom information. The processor 460 may control the playback speed of the video and the volume of audio based on the playback speed information of the video and the audio volume information, which are included in the playback scenario information.

According to an embodiment of the present disclosure, if a user input is received in a state where the video is played based on the playback scenario information, the processor 460 may change the playback state of the video based on the user input. The processor 460 may change the user input to the viewpoint information corresponding to the wide-angle image and may change the viewpoint of the wide-angle image displayed on a display based on the viewpoint information. The processor 460 may change the user input into zoom information and may zoom in or out an image displayed on the display, based on the zoom information. The processor 460 may change the playback speed of the video or may change the volume (or level) of the audio, depending on the user input.

Figure 5:
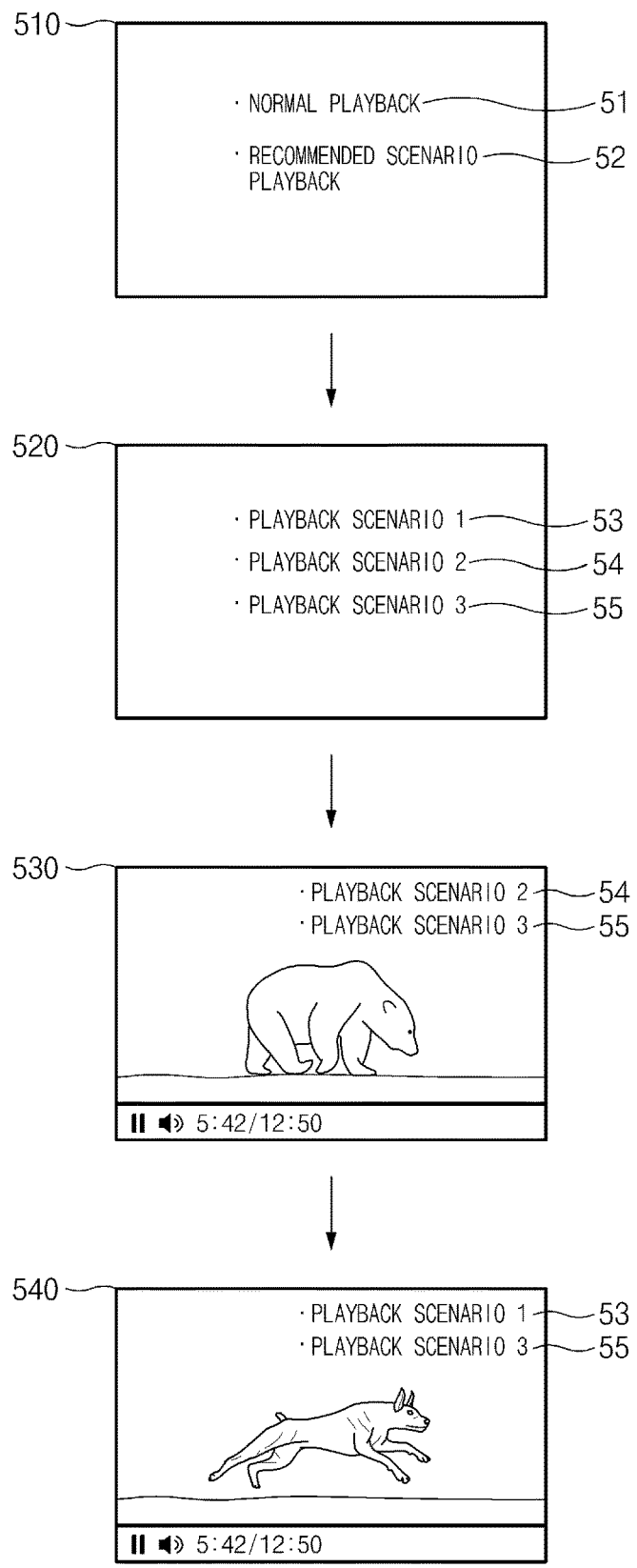
FIG. 5 illustrates a user interface displayed on a display, according to various embodiments of the present disclosure.

FIG. 5 illustrates a user interface displayed on a display, according to various embodiments of the present disclosure.

According to an embodiment of the present disclosure, the processor 460 may display a user interface for playing a video on the display 420. The processor 460 may execute an application that plays a video including a wide-angle image and may display a user interface that the application provides.

According to an embodiment of the present disclosure, if a user input for selecting the video is received through the input module 430, the processor 460 may display a first user interface 510 for selecting a playback mode of the selected video on the display 420. The first user interface 510 may include a first object 51 corresponding to a first mode for playing the video depending on a user input, and a second object 52 corresponding to a second mode for playing the video based on the playback scenario information received from the server 140.

According to an embodiment of the present disclosure, the processor 460 may determine whether the selected video is a video capable of being played depending on the playback scenario information. The processor 460 may determine whether the selected video is a video capable of being played depending on the playback scenario information, based on meta data included in the selected video. The processor 460 may transmit the identification information of the selected video to an external electronic device and may receive information about whether the selected video is a video capable of being played depending on the playback scenario information, from the external electronic device. If the selected video is a video capable of being played depending on the playback scenario information, the processor 460 may display a user interface including the second object 52 for requesting the playback scenario information on the display 420.

According to an embodiment of the present disclosure, if a user input associated with the first object 51 is received, the processor 460 may play the video based on the user input. The processor 460 may play the video and may change the playback state of the video depending on the user input.

According to an embodiment of the present disclosure, if a user input associated with the second object 52 is received, the processor 460 may display a second user interface 520 for selecting the playback scenario information on the display 420. The second user interface 520 may include one or more objects 53, 54, and 55 corresponding to one or more playback scenarios received from a server. The second user interface 520 may include the third object 53 corresponding to first playback scenario information, the fourth object 54 corresponding to second playback scenario information, and the fifth object 55 corresponding to third playback scenario information.

According to an embodiment of the present disclosure, if a user input associated with the third object 53 corresponding to the first playback scenario information is received, the processor 460 may display a third user interface 530 for playing a video on the display 420 based on the first playback scenario information. The third user interface 530 may include a video playback screen according to the first playback scenario information and the fourth object 54 and the fifth object 55, which correspond to other pieces of playback scenario information other than the first playback scenario information. If a specified time (e.g., 5 seconds) elapses after the third user interface 530 is displayed, the processor 460 may delete the fourth object 54 and the fifth object 55 from a display screen.

According to an embodiment of the present disclosure, if a user input associated with the fourth object 54 corresponding to the second playback scenario information is received, the processor 460 may display a fourth user interface 540 for playing the video on the display 420 based on the second playback scenario information. The fourth user interface 540 may include the video playback screen according to the second playback scenario information and the third object 53 and the fifth object 55, which correspond to other pieces of the playback scenario information other than the second playback scenario information.

According to an embodiment of the present disclosure, if a user input for selecting the second playback scenario information is received in a state where the video is being played based on the first playback scenario information, the processor 460 may play the video based on the second playback scenario information from a playback time when the user input is received. Referring to the third user interface 530 and the fourth user interface 540, if a user input associated with the fourth object 54 is received when 5 minutes 42 seconds elapses after playing the video based on the first playback scenario information, the processor 460 may play the video based on the second playback scenario information from a point in time when 5 minutes 42 seconds elapses. If a user input for selecting the second playback scenario information is received in a state where the video is being played based on the first playback scenario information, the processor 460 may play the video again based on the second playback scenario information from the first playback time of the video.

According to an embodiment of the present disclosure, the processor 460 may analyze an image displayed on the display 420, by using an image analysis algorithm and may verify the image includes an object. The processor 460 may display an advertisement associated with the object displayed on the display 420. If it is determined that a vehicle is included in an image during a specified time (or a specified frequency), the processor 460 may display an advertisement associated with the price of a vehicle, or car accessories on the display 420.

Figure 6:
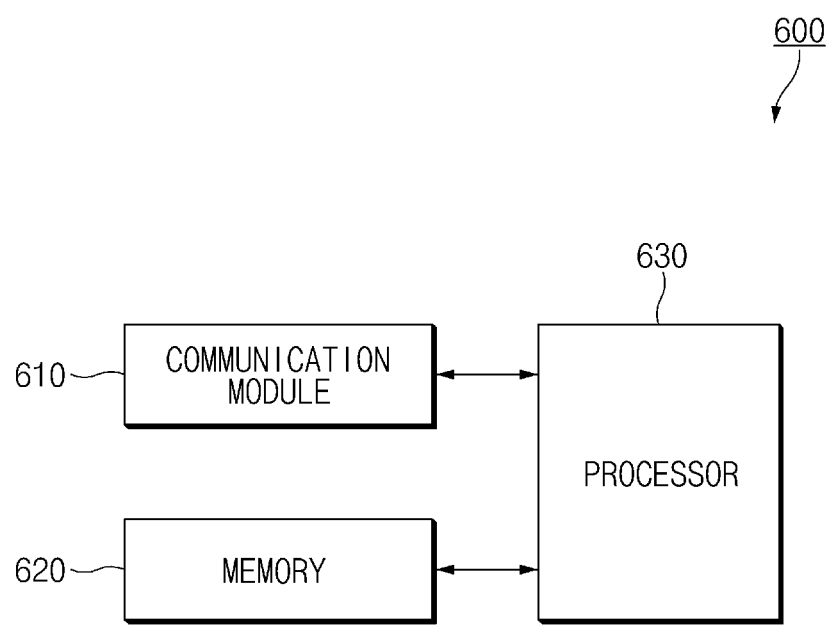
FIG. 6 is a block diagram illustrating a configuration of a server, according to various embodiments of the present disclosure.

FIG. 6 is a block diagram illustrating a configuration of a server, according to various embodiments of the present disclosure.

Referring to FIG. 6, a server 600 may include a communication module 610, a memory 620, and a processor 630.

According to an embodiment of the present disclosure, the communication module 610 may communicate with an external electronic device (e.g., the first electronic device 110 or 120, or the second electronic device 130). The communication module 610 may receive playback history information of a video and/or first profile information from a plurality of first electronic devices. The communication module 610 may receive a request for the playback scenario information of the video and/or the second profile information, from a second electronic device. The communication module 610 may transmit one or more pieces of playback scenario information associated with the second profile information, to the second electronic device in response to the request.

According to an embodiment of the present disclosure, the memory 620 may store the playback history information of the video received from a first electronic device. The memory 620 may store the playback history information in association with the identification information of the video and the first profile information. Hereinafter, Table 1 illustrates an example of the playback history information stored in the memory 620.

TABLE 1

| Video identification information | First profile information | Playback history information |
|---|---|---|
| Video 1 | Profile 1 | Playback history 1 |
|  | Profile 2 | Playback history 2 |
|  | Profile 3 | Playback history 3 |
|  |  | Playback history 4 |
| Video 2 | Profile 1 | Playback history 5 |
|  | Profile 2 | Playback history 6 |
|  | Profile 4 | Playback history 7 |
| . . . | . . . | . . . |

Referring to Table 1, the playback history information may be stored together with the video identification information and the first profile information in the table form. The memory 620 may store pieces of playback history information of a plurality of users with regard to one video. For example, three users corresponding to profile 1 to profile 3 have played video 1, and a user corresponding to profile 3 has played video 1 twice.

According to an embodiment of the present disclosure, the processor 630 may control the overall operations of the server 600. The processor 630 may control each of the communication module 610 and the memory 620, and may generate playback scenario information based on the playback history of the video. The server 600 may include at least one processor 630. The server 600 may include a plurality of processors 630 capable of executing at least one function. The processor 630 may be implemented as an SoC that includes a CPU, a GPU, a memory, etc.

The processor 630 may receive pieces of playback history information of the video from a plurality of first electronic devices through the communication module 610. The processor 630 may receive the video identification information and the first profile information together with the playback history information. The processor 630 may store pieces of playback history information in the memory 620. The processor 630 may store the playback history information in the memory 620 in association with the identification information of the video and the first profile information.

Figure 7:
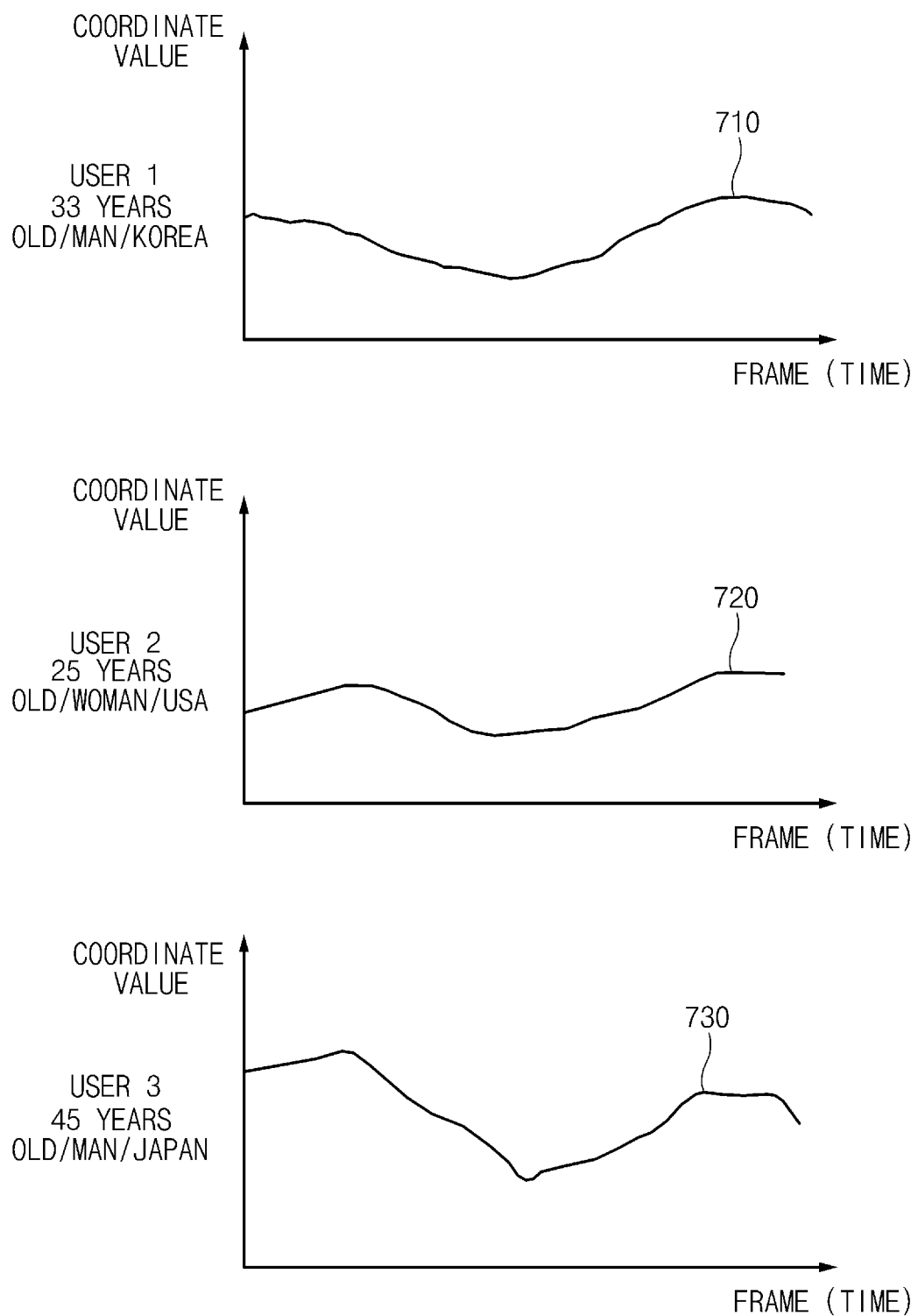
FIG. 7 shows a series of graphs that illustrate a method of verifying playback history information corresponding to a second profile information, according to various embodiments of the present disclosure.

According to an embodiment of the present disclosure, the processor 630 may receive a request for the playback scenario information of the video, from the second electronic device. The request may include the identification information of the video and/or the second profile information. The processor 630 may generate one or more pieces of playback scenario information associated with the second profile information based on the pieces of playback history information stored in the memory 620 in response to the request. If the generation of the playback scenario information is completed, the processor 630 may transmit one or more pieces of playback scenario information to the second electronic device. FIG. 7 shows a series of graphs that illustrate a method of verifying playback history information corresponding to a second profile information, according to various embodiments of the present disclosure.

According to an embodiment of the present disclosure, if a request for playback scenario information is received from a second electronic device, the processor 630 may verify one or more pieces of playback history information, which corresponds to second profile information, from among pieces of playback history information stored in the memory 620. The processor 630 may verify one or more pieces of playback history information, which coincides with at least part of video identification information and the second profile information, from among pieces of playback history information. Referring to FIG. 7, the memory 620 may store a first playback history information 710, a second playback history information 720, and a third playback history information 730, which correspond to the video identification information. The first playback history information 710 may be playback history information about a 33-year-old man living in Korea. The second playback history information 720 may be playback history information about a 25-year-old woman living in the United States. The third playback history information 730 may be playback history information about a 45-year-old man living in Japan. The processor 630 may verify a user's age, gender, and residence location included in the second profile information to determine that the user of the second electronic device is a 25-year-old woman living in the United States. The processor 630 may verify the first playback history information 710 and the third playback history information 730, in each of which the gender coincides with the gender in the second profile information. The processor 630 may verify second playback history information, in which the age coincides with the age in the second profile information.

Figure 8:
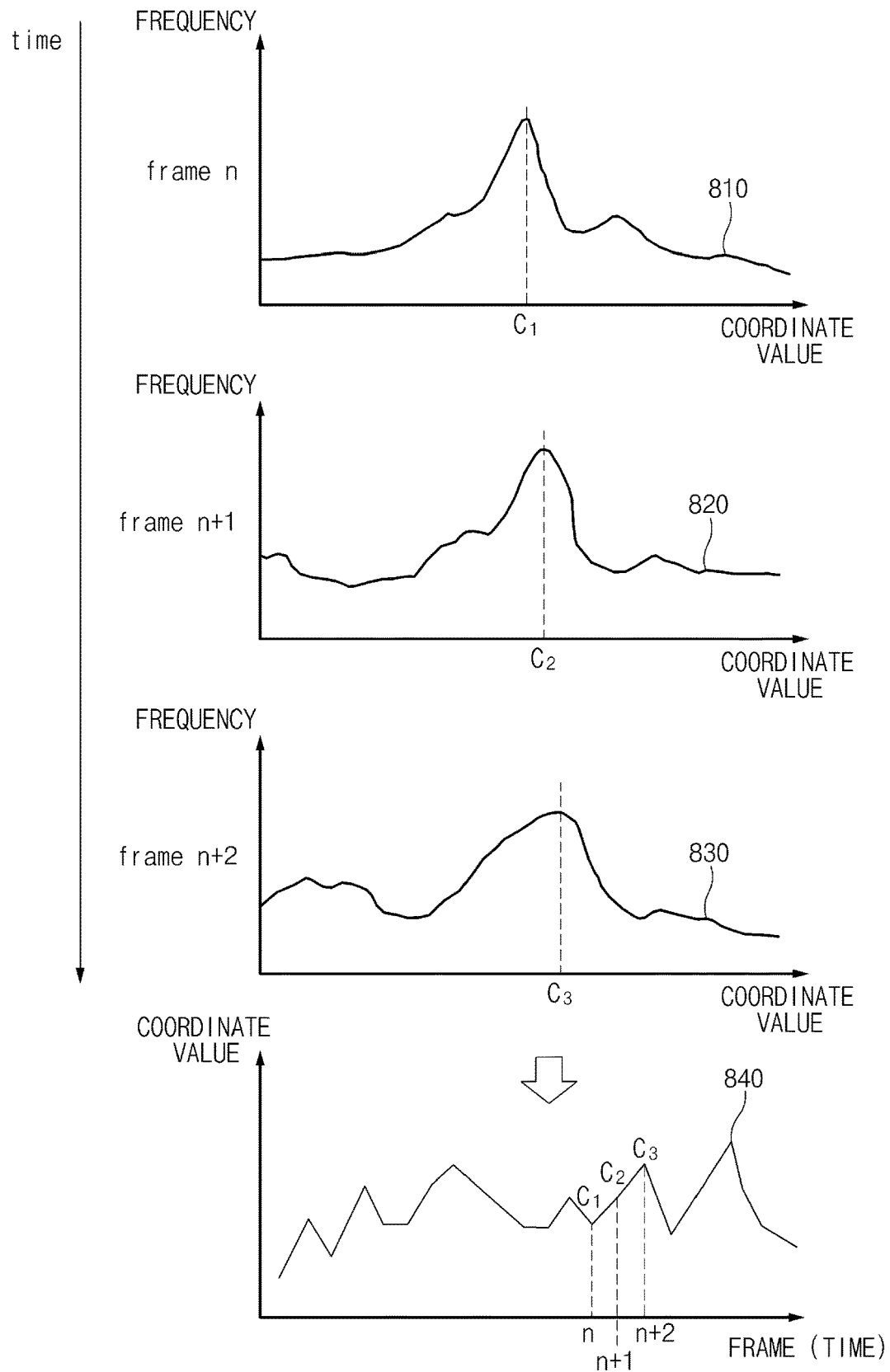
FIG. 8 shows a series of graphs that illustrate a method of generating playback scenario information, according to various embodiments of the present disclosure.

FIG. 8 shows a series of graphs that illustrate a method of generating playback scenario information, according to various embodiments of the present disclosure.

According to an embodiment of the present disclosure, the processor 630 may generate playback scenario information based on the verified one or more pieces of playback history information. The processor 630 may calculate the mode of the verified one or more pieces of playback history information and may generate playback scenario information based on the mode. Referring to FIG. 8, first histogram 810, second histogram 820, and third histogram 830 indicating the frequency according to the value of the playback history information (e.g., a coordinate value indicating information about field of view) for each of a plurality of frames are illustrated. The first histogram 810 may indicate the frequency of the playback history information at frame n. The second histogram 820 may indicate the frequency of the playback history information at frame n+1. The third histogram 830 may indicate the frequency of the playback history information at frame n+2. The processor 630 may generate C1 being the mode of the playback history information of frame n as the playback scenario information, may generate C2 being the mode of the playback history information of frame n+1 as the playback scenario information, and may generate C3 being the mode of the playback history information of frame n+2 as the playback scenario information.

According to an embodiment of the present disclosure, the processor 630 may generate playback scenario information with time, by using the playback scenario information generated for each specified time period or for each image frame of the specified period. The processor 630 may sort playback scenario information for each time period or for each frame, with time. Referring to FIG. 8, playback scenario information 840 generated by sorting pieces of playback scenario information with time for each frame is illustrated. The playback scenario information 840 may include C1 being the mode of playback history information of frame n, C2 being the mode of playback history information of frame n+1, and C3 being the mode of playback history information of frame n+2.

Figure 9:
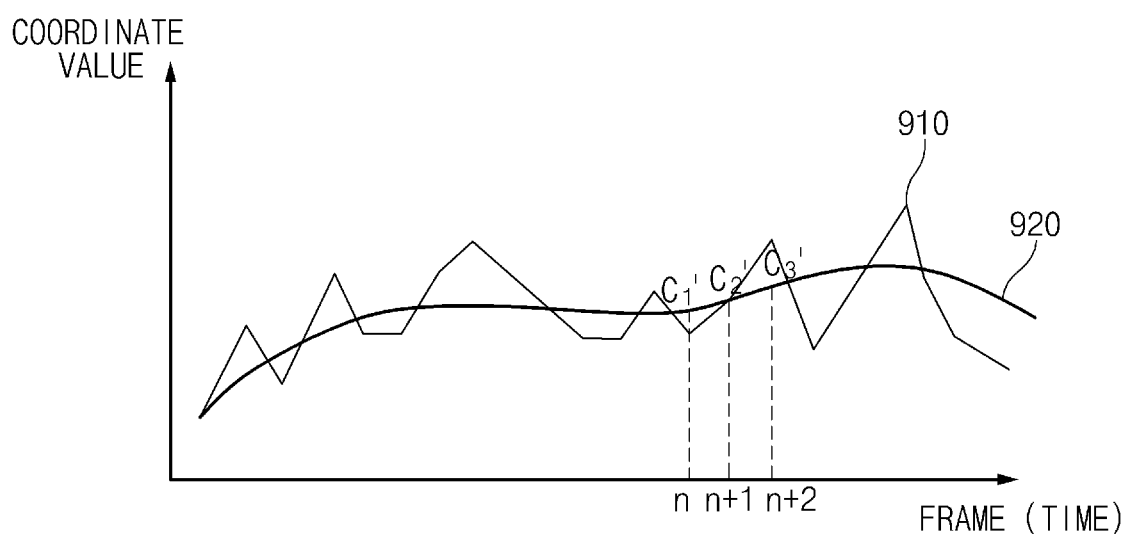
FIG. 9 shows a series of graphs that illustrate a method of correcting playback scenario information, according to various embodiments of the present disclosure.

FIG. 9 shows a series of graphs that illustrate a method of correcting playback scenario information, according to various embodiments of the present disclosure.

Since the playback scenario information is generated based on the mode of playback history information for each time period or for each frame, a differential between values of consecutive pieces of playback scenario information may be very large. In the case where the differential between values of consecutive pieces of playback scenario information is very large, the significant change in a screen or audio volume may occur while a video is played, thereby disturbing the video playback of a user. As such, the processor 630 may correct playback scenario information. The processor 630 may correct the playback scenario information by using a smoothing algorithm. Referring to FIG. 9, playback scenario information 910 before the correction and the corrected playback scenario information 920 are illustrated. The modes C1, C2, and C3 of the pieces of playback scenario information corresponding to frame n, frame n+1, and frame n+2 may be corrected to the modes C1', C2' and C3', respectively. If the playback scenario information 910 before the correction is compared with the corrected playback scenario information 920, it is understood that a differential between the modes C1, C2, and C3 of the pieces of playback scenario information before the correction is reduced. As such, even in the case where the video is played based on the playback scenario information, the state of the natural video playback may be maintained.

According to an embodiment of the present disclosure, the processor 630 may compose pieces of playback scenario information to generate new playback scenario information. The processor 630 may divide the playback time of the video into a plurality of time points. The processor 630 may divide the playback time of the video into a first time and a second time. The processor 630 may compose first scenario information corresponding to the first time and second scenario information corresponding to the second time to generate third playback scenario information.

According to an embodiment of the present disclosure, the processor 630 may compose pieces of playback scenario information associated with second profile information to generate new playback scenario information. The processor 630 may compose a first playback scenario information corresponding to a user's gender and nationality, and second playback scenario information corresponding to the user's age to generate the third playback scenario information.

Figure 10:
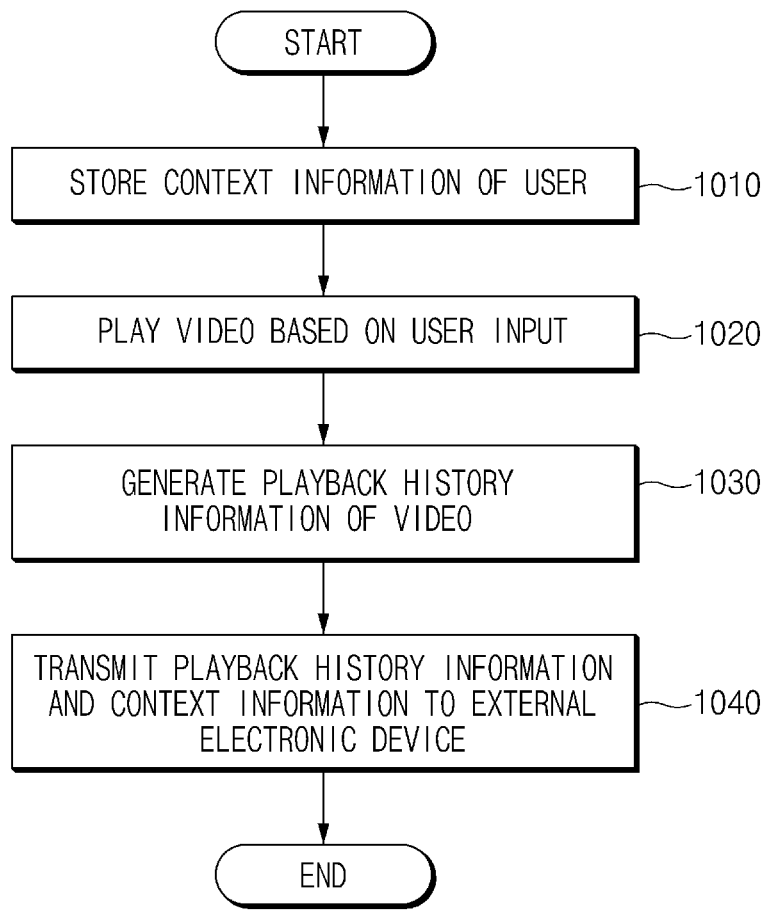
FIG. 10 is a flowchart illustrating a video playback method of a first electronic device, according to various embodiments of the present disclosure.

FIG. 10 is a flowchart illustrating a video playback method of a first electronic device, according to various embodiments of the present disclosure.

The flowchart illustrated in FIG. 10 may include operations processed by the above-described first electronic device 110 or 120, 200. In step 1010, the first electronic device may store profile information (or context information) (e.g., a first profile information) of a user. The profile information may include at least one of the user's age, gender, occupation, friend, residence location, nationality, hobby, and interest.

In step 1020, the first electronic device may play a video based on a user input. The first electronic device may play the video and may change the playback state of the video depending on the user input.

In step 1030, the first electronic device may generate playback history information of the video. According to an embodiment of the present disclosure, the first electronic device may store the playback history information of the video in a memory. The first electronic device may store the playback state of the video that is changed with time. If the playback history information is generated, the first electronic device may store the playback history information in the memory in association with the profile information of the user.

In step 1040, the first electronic device may transmit the playback history information and the profile information (or context information) to an external electronic device 140.

Figure 11:
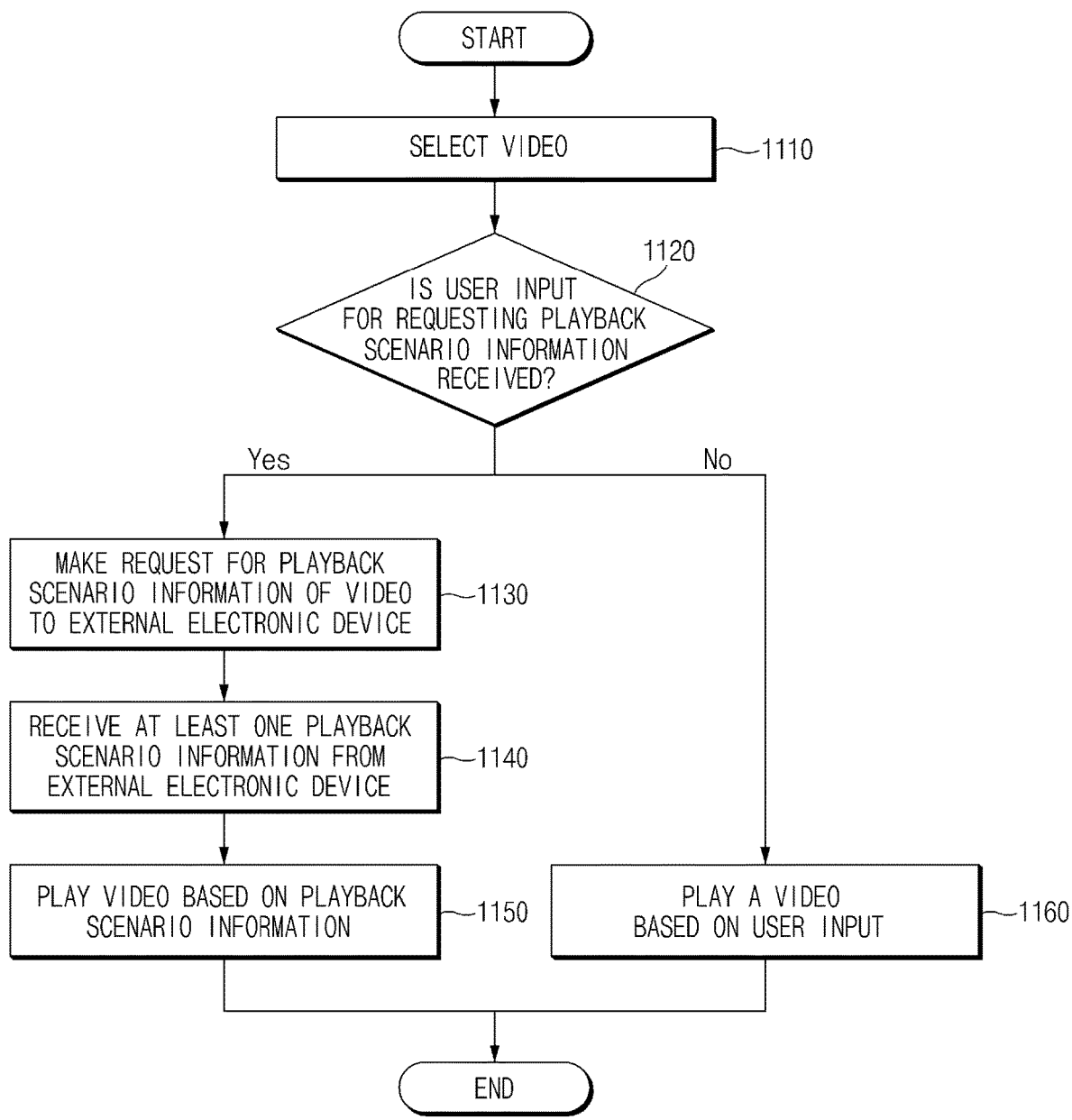
FIG. 11 is a flowchart illustrating a video playback method of a second electronic device, according to various embodiments of the present disclosure.

FIG. 11 is a flowchart illustrating a video playback method of a second electronic device, according to various embodiments of the present disclosure.

The flowchart illustrated in FIG. 11 may include operations processed by the above-described second electronic device. In step 1110, the second electronic device may select a video. The second electronic device may select the video based on a user input.

In step 1120, the second electronic device may determine whether a user input for requesting playback scenario information is received. According to an embodiment of the present disclosure, the second electronic device may determine whether the selected video is a video capable of being played depending on the playback scenario information. The second electronic device may determine whether the selected video is a video capable of being played depending on the playback scenario information, based on meta data included in the selected video. The second electronic device may transmit the identification information of the selected video to an external electronic device and may receive information about whether the selected video is a video capable of being played depending on the playback scenario information, from the external electronic device. If the selected video is the video capable of being played depending on the playback scenario information, the second electronic device may display a user interface (or an object) for requesting the playback scenario information on a display, and may receive the user input for requesting the playback scenario information, through the user interface.

In step 1130, the second electronic device may make a request for the playback scenario information of the video to the external electronic device. According to an embodiment of the present disclosure, the request for the playback scenario information may include second profile information (or second context information).

In step 1140, the second electronic device may receive one or more pieces of playback scenario information from the external electronic device. The playback scenario information may be generated based on the playback history information, which is generated by a first user of a plurality of first electronic devices and which coincides with at least one of the age of a second user of the second electronic device, the gender of the second user, the occupation of the second user, the friend of the second user, the residence location of the second user, the nationality of the second user, the hobby of the second user, the interest of the second user, the current location of the second electronic device, the size of the display, the resolution of the display, or the frame rate of the display.

In step 1150, the second electronic device may play the video based on one or more pieces of playback scenario information. According to an embodiment of the present disclosure, the second electronic device may display a part of a wide-angle image on a display based on a viewpoint information included in the playback scenario information. The second electronic device may display a part of a wide-angle image on a display based on zoom information included in the playback scenario information. The second electronic device may control the playback speed of the video and the volume of audio based on playback speed information of the video and audio volume information, which are included in the playback scenario information.

According to an embodiment of the present disclosure, if a user input for selecting the second playback scenario information is received in a state where a video is being played based on the first playback scenario information, the second electronic device may play a video based on the second playback scenario information from a playback time when the user input is received. If a user input for selecting the second playback scenario information is received in a state where a video is being played based on the first playback scenario information, the second electronic device may play the video again based on the second playback scenario information from the first playback time of the video.

According to an embodiment of the present disclosure, if a user input is received in a state where the video is being played based on the playback scenario information, the second electronic device may change the playback state of the video based on the user input.

If the user input for requesting the playback scenario information is not received, in step 1160, the second electronic device may play a video based on a user input. The second electronic device may play the video and may change the playback state of the video depending on the user input.

Figure 12:
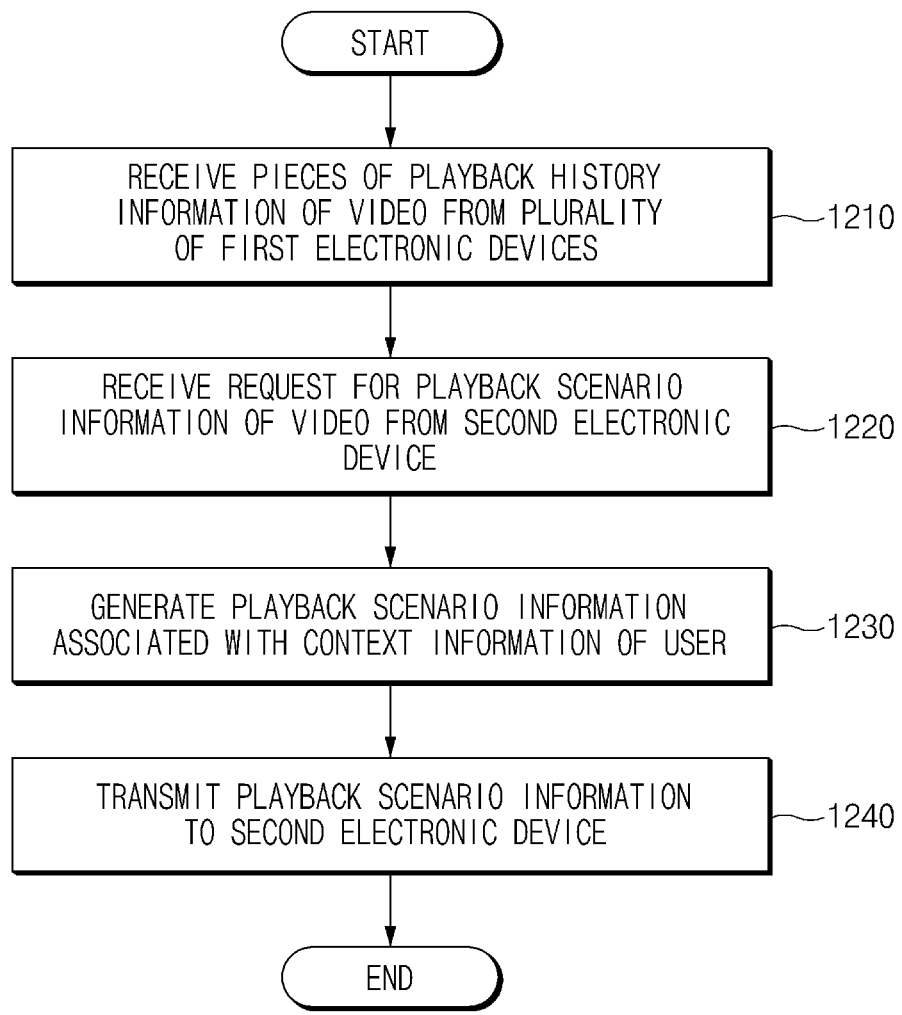
FIG. 12 is a flowchart illustrating an information generating method of a server, according to various embodiments of the present disclosure.

FIG. 12 is a flowchart illustrating an information generating method of a server, according to various embodiments of the present disclosure.

The flowchart illustrated in FIG. 12 may include operations processed by the above-described server 140 or 600. In step 1210, the server may receive pieces of playback history information of a video from a plurality of first electronic devices. According to an embodiment of the present disclosure, the server may receive the video identification information and first profile information together with the pieces of playback history information.

In step 1220, the server may receive a request for the playback scenario information of the video, from the second electronic device. According to an embodiment of the present disclosure, the request may include the identification information of the video and/or second profile information.

In step 1230, the server may generate one or more pieces of playback scenario information associated with the second profile information, based on the pieces of playback history information. According to an embodiment of the present disclosure, a server may verify one or more pieces of playback history information, which corresponds to the second profile information, from among pieces of playback history information stored in a memory. The server may generate playback scenario information based on the verified one or more pieces of playback history information. The server may calculate the mode of the verified one or more pieces of playback history information and may generate playback scenario information based on the mode. The server may generate playback scenario information with time, by using the playback scenario information generated for each specified time period or for each image frame of the specified period. The server may correct playback scenario information by using a smoothing algorithm.

According to an embodiment of the present disclosure, the server may compose pieces of playback scenario information to generate new playback scenario information. The server may divide the playback time of the video into a first time and a second time, and may compose first scenario information corresponding to the first time and second scenario information corresponding to the second time to generate third playback scenario information.

In step 1240, the server may transmit one or more pieces of playback scenario information to the second electronic device 400.

Figure 13:
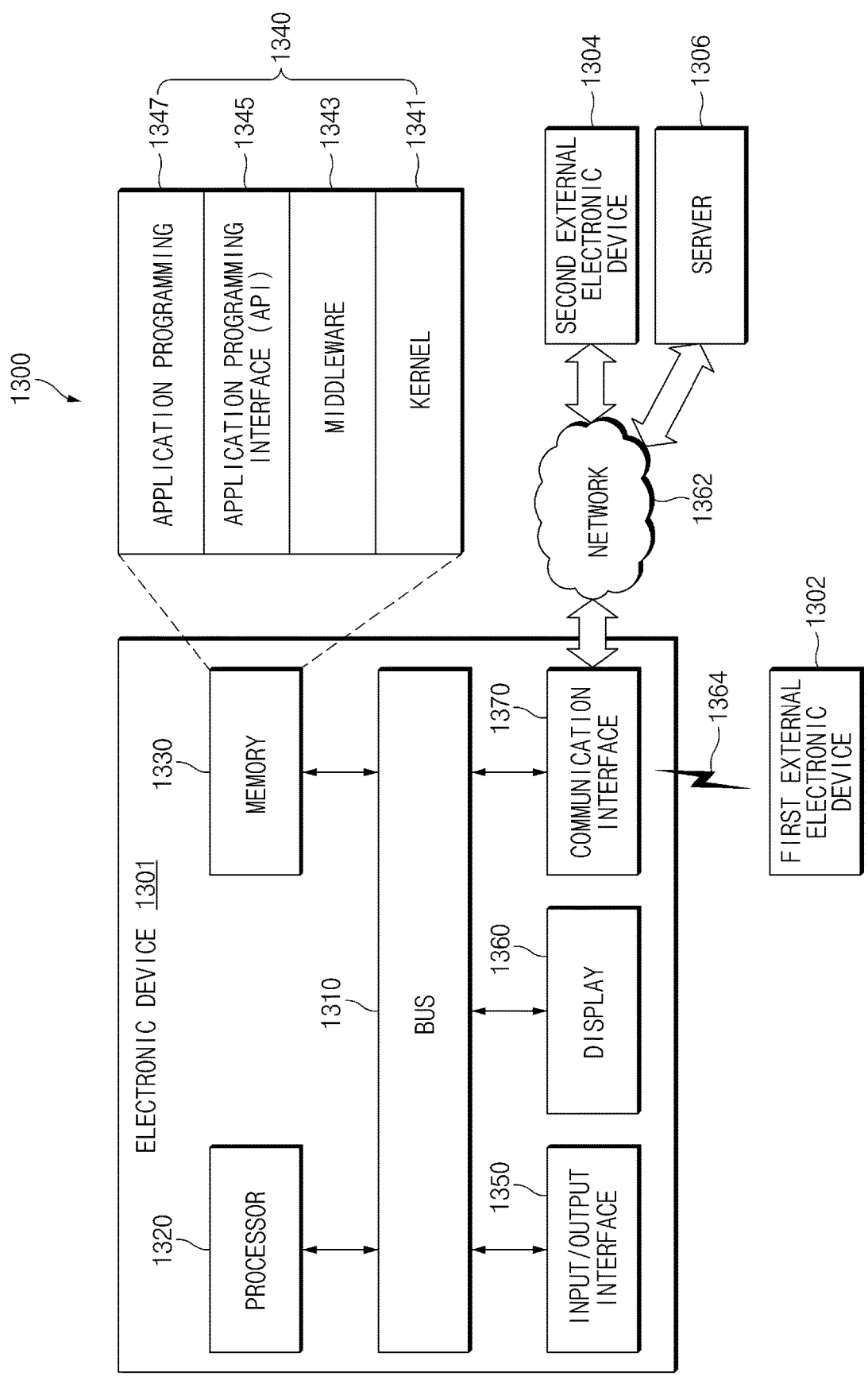
FIG. 13 is a view illustrating an electronic device, according to various embodiments of the present disclosure.

FIG. 13 is a view illustrating an electronic device, according to various embodiments of the present disclosure.

Referring to FIG. 13, an electronic device 1301 in a network environment 1300 may include a bus 1310, a processor 1320, a memory 1330, an input/output interface 1350, a display 1360, and a communication interface 1370. According to an embodiment of the present disclosure, the electronic device 1301 may not include at least one of the above-described elements or may further include other element(s). The bus 1310 may interconnect the above-described elements 1320 to 1370 and may include a circuit for conveying communications (e.g., a control message and/or data) among the above-described elements. The processor 1320 may include one or more of a CPU, an AP, or a communication processor (CP). The processor 1320 may perform an arithmetic operation or data processing associated with control and/or communication of other elements of the electronic device 1301.

The memory 1330 may include a volatile and/or nonvolatile memory. The memory 1330 may store instructions or data associated with at least one other element(s) of the electronic device 1301. According to an embodiment of the present disclosure, the memory 1330 may store software and/or a program 1340. The program 1340 may include a kernel 1341, a middleware 1343, an application programming interface (API) 1345, and/or applications 1347. At least a part of the kernel 1341, the middleware 1343, or the API 1345 may be referred to as an operating system (OS). The kernel 1341 may control or manage system resources (e.g., the bus 1310, the processor 1320, the memory 1330, etc.) that are used to execute operations or functions of other programs (e.g., the middleware 1343, the API 1345, and the applications 1347). Furthermore, the kernel 1341 may provide an interface that allows the middleware 1343, the API 1345, or the applications 1347 to access discrete elements of the electronic device 1301 so as to control or manage system resources.

The middleware 1343 may perform a mediation role such that the API 1345 or the applications 1347 communicates with the kernel 1341 to exchange data. Furthermore, the middleware 1343 may process one or more task requests received from the applications 1347 according to a priority. The middleware 1343 may assign the priority, which makes it possible to use a system resource (e.g., the bus 1310, the processor 1320, the memory 1330, etc.) of the electronic device 1301, to at least one of the applications 1347 and may process the one or more task requests. The API 1345 may be an interface through which the applications 1347 controls a function provided by the kernel 1341 or the middleware 1343, and may include an interface or function (e.g., an instruction) for a file control, a window control, image processing, a character control, etc. The input/output interface 1350 may transmit an instruction or data input from a user or another external device, to other element(s) of the electronic device 1301 or may output an instruction or data, received from other element(s) of the electronic device 1301, to a user or another external device.

The display 1360 may include a liquid crystal display (LCD), a light-emitting diode (LED) display, an organic LED (OLED) display, a microelectromechanical systems (MEMS) display, or an electronic paper display. The display 1360 may display various content (e.g., a text, an image, a video, an icon, a symbol, etc.) to a user. The display 1360 may include a touch screen and may receive a touch, gesture, proximity, or hovering input using an electronic pen or a part of a user's body.

The communication interface 1370 may establish communication between the electronic device 1301 and an external device (e.g., the first electronic device 1302, the second electronic device 1304, or the server 1306). The communication interface 1370 may be connected to the network 1362 over wireless communication or wired communication to communicate with the external device.

The wireless communication may include cellular communication using long-term evolution (LTE), LTE advanced (LTE-A), code division multiple access (CDMA), wideband CDMA (WCDMA), universal mobile telecommunications system (UMTS), wireless broadband (WiBro), global system for mobile communications (GSM), etc. The wireless communication may include at least one of Wi-Fi, Bluetooth™, Bluetooth low energy (BLE), Zigbee, NFC, magnetic stripe transmission (MST), radio frequency (RF), a body area network, etc. According to an embodiment of the present disclosure, the wireless communication may include GNSS. The GNSS may be one of a GPS, a global navigation satellite system (Glonass), a Beidou navigation satellite system (Beidou), or the European global satellite-based navigation system (Galileo). Hereinafter, in the present disclosure, the terms "GPS" and "GNSS" may be interchangeably used. The wired communication may include a universal serial bus (USB), a high definition multimedia interface (HDMI), a recommended standard-232 (RS-232), powerline communication, a plain old telephone service (POTS), etc. The network 1362 may include at least one of telecommunications networks, for example, a computer network (e.g., LAN or WAN), an Internet, or a telephone network.

Each of the first external electronic device 1302 and the second external electronic device 1304 may be a device of which the type is different from or the same as that of the electronic device 1301. According to various embodiments of the present disclosure, all or a portion of operations that the electronic device 1301 will perform may be executed by another or plural electronic devices (e.g., the first external electronic device 1302, the external second electronic device 1304, or the server 1306). In the case where the electronic device 1301 executes any function or service automatically or in response to a request, the electronic device 1301 may not perform the function or the service internally, but it may request at least a portion of a function associated with the electronic device 1301 at another electronic device. The other electronic device may execute the requested function or additional function, and may transmit the execution result to the electronic device 1301. The electronic device 1301 may provide the requested function or service using the received result or may additionally process the received result to provide the requested function or service. To this end cloud computing, distributed computing, or client-server computing may be used.

Figure 14:
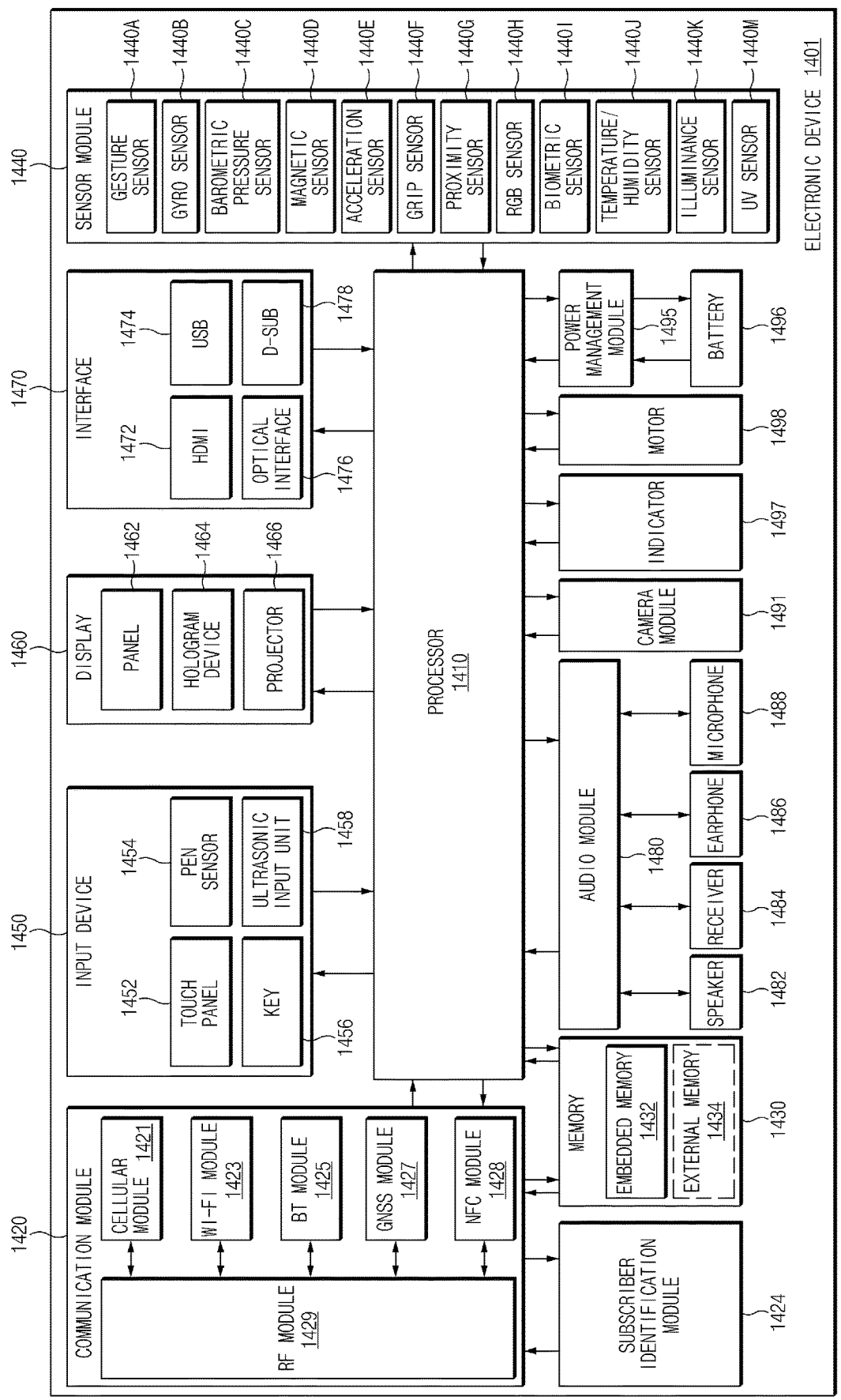
FIG. 14 is a block diagram of the electronic device, according to various embodiments of the present disclosure.

FIG. 14 is a block diagram of an electronic device, according to various embodiments of the present disclosure.

An electronic device 1401 may include all or a part of the electronic device 1301. The electronic device 1401 may include one or more processors 1410 (e.g., an AP), a communication module 1420, a subscriber identification module (SIM) 1424, a memory 1430, a sensor module 1440, an input device 1450, a display 1460, an interface 1470, an audio module 1480, a camera module 1491, a power management module 1495, a battery 1496, an indicator 1497, and a motor 1498. For example, the processor 1410 may be implemented with an SoC. According to an embodiment of the present disclosure, the processor 1410 may further include a GPU and/or an image signal processor (ISP). The processor 1410 may include at least a part (e.g., a cellular module 1421) of the elements of electronic device 1401. The processor 1410 may load an instruction or data, which is received from at least one of other elements (e.g., a nonvolatile memory), into a volatile memory and process the loaded instruction or data. The processor 1410 may store result data in the nonvolatile memory.

The communication module 1420 may be configured the same as or similar to the communication interface 1370. The communication module 1420 may include the cellular module 1421, a Wi-Fi module 1423, a Bluetooth (BT) module 1425, a GNSS module 1427, an NFC module 1428, and a radio frequency (RF) module 1429. The cellular module 1421 may provide voice communication, video communication, a character service, an Internet service, etc. over a communication network. According to an embodiment of the present disclosure, the cellular module 1421 may perform discrimination and authentication of the electronic device 1401 within a communication network by using the SIM 1424 (e.g., a SIM card). The cellular module 1421 may perform at least a portion of functions that the processor 1410 provides. The cellular module 1421 may include a CP. At least a part (e.g., two or more) of the cellular module 1421, the Wi-Fi module 1423, the BT module 1425, the GNSS module 1427, or the NFC module 1428 may be included within one integrated circuit (IC) or an IC package. The RF module 1429 may transmit and receive a communication signal (e.g., an RF signal). For example, the RF module 1429 may include a transceiver, a power amplifier module (PAM), a frequency filter, a low noise amplifier (LNA), an antenna, etc. At least one of the cellular module 1421, the Wi-Fi module 1423, the BT module 1425, the GNSS module 1427, or the NFC module 1428 may transmit and receive an RF signal through a separate RF module. The SIM 1424 may include a card and/or embedded SIM that includes a subscriber identification module and may include unique identify information (e.g., integrated circuit card identifier (ICCID)) or subscriber information (e.g., international mobile subscriber identity (IMSI)).

The memory 1430 may include an internal memory 1432 or an external memory 1434. The internal memory 1432 may include a volatile memory (e.g., a dynamic random access memory (DRAM), a static RAM (SRAM), a synchronous DRAM (SDRAM), etc.), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory, a hard drive, or a solid state drive (SSD). The external memory 1434 may include a flash drive such as compact flash (CF), secure digital (SD), micro secure digital (Micro-SD), mini secure digital (Mini-SD), extreme digital (xD), a multimedia card (MMC), a memory stick, etc. The external memory 1434 may be operatively and/or physically connected to the electronic device 1401 through various interfaces.

The sensor module 1440 may measure a physical quantity or may detect an operation state of the electronic device 1401. The sensor module 1440 may convert the measured or detected information to an electric signal. The sensor module 1440 may include a gesture sensor 1440A, a gyro sensor 1440B, a barometric pressure sensor 1440C, a magnetic sensor 1440D, an acceleration sensor 1440E, a grip sensor 1440F, the proximity sensor 1440G, a color sensor 1440H (e.g., red, green, blue (RGB) sensor), a biometric sensor 1440I, a temperature/humidity sensor 1440J, an illuminance sensor 1440K, or an UV sensor 1440M. Additionally or generally, the sensor module 1440 may further include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1440 may further include a control circuit for controlling one or more sensors included therein. According to an embodiment of the present disclosure, the electronic device 1401 may further include a processor that is a part of the processor 1410 or independent of the processor 1410, and is configured to control the sensor module 1440. The processor may control the sensor module 1440 while the processor 1410 remains at a sleep state.

The input device 1450 may include a touch panel 1452, a (digital) pen sensor 1454, a key 1456, or an ultrasonic input unit 1458. The touch panel 1452 may use at least one of capacitive, resistive, infrared, and ultrasonic detecting methods. Also, the touch panel 1452 may further include a control circuit. The touch panel 1452 may further include a tactile layer to provide a tactile reaction to a user. The (digital) pen sensor 1454 may be a part of a touch panel or may include an additional sheet for recognition. The key 1456 may include a physical button, an optical key, or a keypad. The ultrasonic input device 1458 may detect (or sense) an ultrasonic signal, which is generated from an input device, through a microphone 1488 and may check data corresponding to the detected ultrasonic signal.

The display 1460 may include a panel 1462, a hologram device 1464, a projector 1466, and/or a control circuit for controlling the panel 1462, the hologram device 1464, or the projector 1466. The panel 1462 may be implemented to be flexible, transparent, or wearable. The panel 1462 and the touch panel 1452 may be integrated into a single module. The panel 1462 may include a pressure sensor (or force sensor) that measures the intensity of touch pressure by a user. The pressure sensor may be integrated with the touch panel 1452, or may be implemented as at least one sensor separately from the touch panel 1452. The hologram device 1464 may display a stereoscopic image in a space using a light interference phenomenon. The projector 1466 may project light onto a screen so as to display an image. The screen may be arranged in the inside or the outside of the electronic device 1401. The interface 1470 may include an HDMI 1472, a USB 1474, an optical interface 1476, or a D-subminiature (D-sub) 1478. The interface 1470 may be included in the communication interface 1370. Additionally or generally, the interface 1470 may include a mobile high definition link (MHL) interface, a SD card/multi-media card (MMC) interface, or an Infrared Data Association (IrDA) standard interface.

The audio module 1480 may convert a sound and an electric signal in dual directions. At least a part of the audio module 1480 may be included in the input/output interface 135. The audio module 1480 may process sound information that is input or output through a speaker 1482, a receiver 1484, an earphone 1486, or the microphone 1488. The camera module 1491 may shoot a still image or a video. The camera module 1491 may include one or more image sensors (e.g., a front sensor or a rear sensor), a lens, an ISP, or a flash (e.g., an LED or a xenon lamp). The power management module 1495 may manage power of the electronic device 1401. A power management integrated circuit (PMIC), a charger IC, or a battery gauge may be included in the power management module 1495. The PMIC may have a wired charging method and/or a wireless charging method. The wireless charging method may include a magnetic resonance method, a magnetic induction method, or an electromagnetic method, and may further include an additional circuit, for example, a coil loop, a resonant circuit, a rectifier, etc. The battery gauge may measure a remaining capacity of the battery 1496 and a voltage, current or temperature thereof while the battery is charged. The battery 1496 may include a rechargeable battery and/or a solar battery.

The indicator 1497 may display a specific state of the electronic device 1401 or a part thereof (e.g., the processor 1410), such as a booting state, a message state, a charging state, etc. The motor 1498 may convert an electrical signal into a mechanical vibration and may generate the following a vibration effect, a haptic effect, etc. The electronic device 1401 may include a processing device (e.g., a GPU) for supporting a mobile TV. The processing device for supporting the mobile TV may process media data according to the standards of digital multimedia broadcasting (DMB), digital video broadcasting (DVB), MediaFLO™, etc. Each of the above-mentioned elements of the electronic device according to various embodiments of the present disclosure may be configured with one or more components, and the names of the elements may be changed according to the type of the electronic device. Some elements of the electronic device 1401 may be omitted or other additional elements may be added. Furthermore, some of the elements of the electronic device may be combined with each other so as to form one entity, so that the functions of the elements may be performed in the same manner as before the combination.

Figure 15:
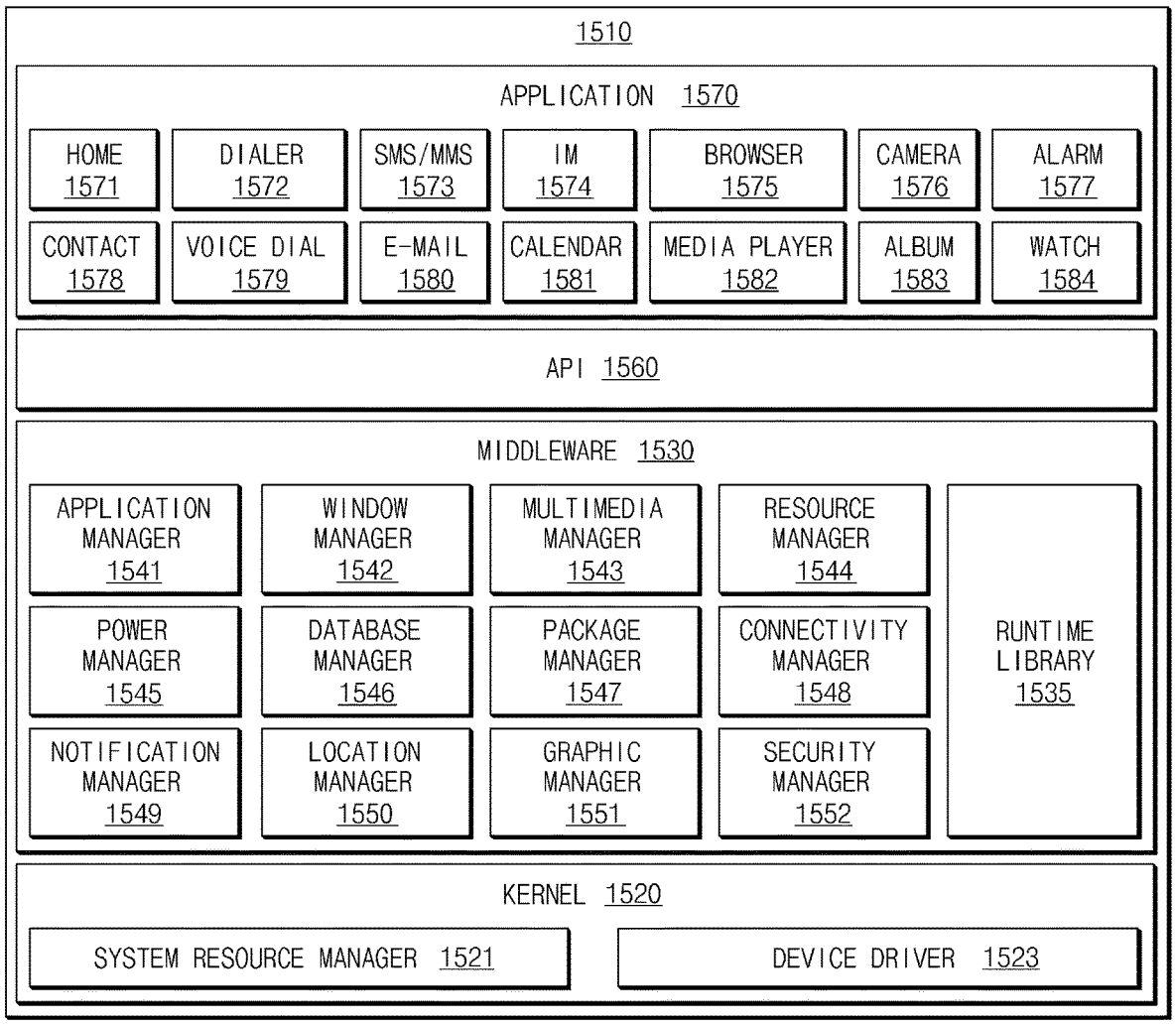
FIG. 15 is a block diagram of a program module, according to various embodiments of the present disclosure.

FIG. 15 illustrates a block diagram of a program module, according to various embodiments.

According to an embodiment of the present disclosure, a program module 1510 may include an OS to control resources associated with an electronic device 301, and/or applications 1347 driven on the OS. The OS may be Android™, iOS™, Windows™, Symbian™, Tizen™, or Bada™. The program module 1510 may include a kernel 1520, a middleware 1530, an API 1560, and/or an application 1570. At least a portion of the program module 1510 may be preloaded on an electronic device or may be downloadable from an external electronic device.

The kernel 1520 may include a system resource manager 1521 or a device driver 1523. The system resource manager 1521 may control, allocate, or retrieve system resources. The system resource manager 1521 may include a process managing unit, a memory managing unit, a file system managing unit, etc. The device driver 1523 may include a display driver, a camera driver, a Bluetooth driver, a shared memory driver, a USB driver, a keypad driver, a Wi-Fi driver, an audio driver, or an inter-process communication (IPC) driver. The middleware 1530 may provide a function that the application 1570 needs in common, or may provide diverse functions to the application 1570 through the API 1560 to allow the application 1570 to efficiently use limited system resources of the electronic device. The middleware 1530 may include at least one of a runtime library 1535, an application manager 1541, a window manager 1542, a multimedia manager 1543, a resource manager 1544, a power manager 1545, a database manager 1546, a package manager 1547, a connectivity manager 1548, a notification manager 1549, a location manager 1550, a graphic manager 1551, or a security manager 1552.

The runtime library 1535 may include a library module that is used by a compiler to add a new function through a programming language while the application 1570 is being executed. The runtime library 1535 may perform input/output management, memory management, or capacities about arithmetic functions. The application manager 1541 may manage a life cycle of at least one application of the application 1570. The window manager 1542 may manage a graphic user interface (GUI) resource that is used in a screen. The multimedia manager 1543 may identify a format necessary for playing diverse media files, and may perform encoding or decoding of media files by using a codec suitable for the format. The resource manager 1544 may manage resources such as a memory space or source code of the application 1570. The power manager 1545 may manage a battery or power, and may provide power information for an operation of an electronic device. The power manager 1545 may operate with a basic input/output system (BIOS). The database manager 1546 may generate, search for, or modify database that is to be used in the application 1570. The package manager 1547 may install or update an application that is distributed in the form of package file.

The connectivity manager 1548 may manage wireless connection. The notification manager 1549 may provide an event arrival message, appointment, or proximity notification to a user. The location manager 1550 may manage location information about an electronic device. The graphic manager 1551 may manage a graphic effect that is provided to a user, or manage a user interface relevant thereto. The security manager 1552 may provide system security or user authentication. The middleware 1530 may include a telephony manager for managing a voice or video call function of the electronic device or a middleware module that combines diverse functions of the above-described elements. The middleware 1530 may provide a module specialized to each OS kind to provide differentiated functions. Additionally, the middleware 1530 may dynamically remove a part of the preexisting elements or may add new elements thereto. The API 1560 may be a set of programming functions and may be provided with a configuration that is variable depending on the type of OS. For example, in the case where an OS is Android or iOS, it may provide one API set per platform. In the case where an OS is Tizen, it may provide two or more API sets per platform.

The application 1570 may include applications such as a home application 1571, a dialer application 1572, an SMS/MMS application 1573, an instant message (IM) application 1574, a browser application 1575, a camera application 1576, an alarm application 1577, a contact application 1578, a voice dial application 1579, an e-mail application 1580, a calendar application 1581, a media player application 1582, an album application 1583, a watch application 1584, a healthcare application (e.g., measuring an exercise quantity, blood sugar level, etc.) or an application that offers environment information (e.g., information of barometric pressure, humidity, temperature, etc.). The application 1570 may include an information exchanging application to support information exchange between an electronic device and an external electronic device. The information exchanging application may include a notification relay application for transmitting specific information to an external electronic device, or a device management application for managing the external electronic device. The notification relay application may include a function of transmitting notification information, which arise from other applications, to an external electronic device or may receive notification information from an external electronic device and provide the notification information to a user. The device management application may install, delete, or update a function (e.g., turn-on/turn-off of an external electronic device itself (or a part of components) or adjustment of brightness (or resolution) of a display) of the external electronic device which communicates with the electronic device, and an application running in the external electronic device. The application 1570 may include an application (e.g., a healthcare application of a mobile medical device) that is assigned in accordance with an attribute of an external electronic device. The application 1570 may include an application that is received from an external electronic device. At least a portion of the program module 1510 may be implemented by software, firmware, hardware, or a combination (e.g., execution) of two or more thereof, and may include modules, programs, routines, sets of instructions, processes, etc. for performing one or more functions.

The term "module" used in the present disclosure may include a unit composed of hardware, software, and firmware and may be interchangeably used with the terms "unit", "logic", "logical block", "component", and "circuit". The "module" may be an integrated component or may be a minimum unit for performing one or more functions or a part thereof. The "module" may be implemented mechanically or electronically and may include at least one of an application specific IC (ASIC) chip, a field programmable gate array (FPGA), and a programmable-logic device for performing some operations, which are known or will be developed.

At least a part of an apparatus (e.g., modules or functions thereof) or a method (e.g., operations) may be implemented by instructions stored in computer-readable storage media in the form of a program module. The instruction, when executed by a processor, may cause the processor to perform a function corresponding to the instruction. A computer-readable recording medium may include a hard disk, a floppy disk, a magnetic media (e.g., a magnetic tape), an optical media (e.g., a compact disc read only memory (CD-ROM) and a DVD, a magneto-optical media (e.g., a floptical disk)), and an internal memory. Also, a program instruction may include not only assembly code such as things generated by a compiler but also a high-level language code executable on a computer using an interpreter. A module or a program module may include at least one of the above elements, or a part of the above elements may be omitted, or other elements may be further included.

Operations performed by a module, a program module, or other elements may be executed sequentially, in parallel, repeatedly, or in a heuristic method or some operations may be executed in different sequences or may be omitted. Alternatively, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a communication module;
a display;
a memory configured to store context information of a user; and
a processor configured to:
determine whether a first user input is received;
in response to determining that the first user input is received, the processor is further configured to:
select a video capable of being played depending on playback scenario information associated with the stored context information of the user, wherein a video comprises a first wide-angle image and a second wide-angle image;
display a first user interface for selecting a playback mode of the selected video on the display, wherein the first user interface includes a first object corresponding to a first mode, and a second object corresponding to a second mode; and
play the video based on the selected playback mode of the video,
in response to determining that the first user input is not received, the processor is further configured to change a playback state of the video depending on a second user input while the video is played,
wherein if a third user input selecting the second object is received, the processor is further configured to:
receive, from an external electronic device, the playback scenario information associated with the stored context information of the user, the playback scenario information comprising viewpoint information including coordinate information on a three-dimensional coordinate system for displaying the first wide-angle image at a first time and the second wide-angle image at a second time, and
change the playback state of the video depending on the playback scenario information associated with the stored context information of the user while the video is played,
wherein the context information includes at least one of an occupation of the user, a friend of the user, a nationality of the user, a hobby of the user, and a location of the electronic device,
wherein the video includes a wide-angle image that is not capable of being displayed on the display at one time, and
wherein the wide-angle image has a field of view wider than a field of view of the display.

2. The electronic device of claim 1, wherein the processor is further configured to:
transmit a request for the playback scenario information of the video to the external electronic device through the communication module, wherein the request includes the context information.

3. The electronic device of claim 1, wherein the playback scenario information further includes zoom information for each playback time, and wherein the processor is further configured to:

zoom in or out from an image displayed on the display, based on the zoom information.

4. The electronic device of claim 1, wherein the playback scenario information further includes at least one of playback speed information of the video for each playback time and audio volume information for each playback time.

5. The electronic device of claim 1, wherein the context information further includes at least one of a size of the display, a resolution of the display, and a frame rate of the display.

* * * * *